United States Patent
Zhao et al.

(10) Patent No.: US 12,399,369 B2
(45) Date of Patent: Aug. 26, 2025

(54) CURVED LIGHT GUIDE IMAGE COMBINER AND SYSTEM INCLUDING THE SAME

(71) Applicant: Meta Platforms Technologies, LLC, Menlo Park, CA (US)

(72) Inventors: Zhexin Zhao, Redmond, WA (US); Xiayu Feng, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 478 days.

(21) Appl. No.: 17/981,444

(22) Filed: Nov. 6, 2022

(65) Prior Publication Data
US 2023/0213765 A1  Jul. 6, 2023

Related U.S. Application Data

(60) Provisional application No. 63/345,026, filed on May 23, 2022, provisional application No. 63/295,835, filed on Dec. 31, 2021.

(51) Int. Cl.
*G02B 27/01* (2006.01)
*F21V 8/00* (2006.01)
*G02B 5/10* (2006.01)

(52) U.S. Cl.
CPC .......... *G02B 27/0172* (2013.01); *G02B 5/10* (2013.01); *G02B 6/0031* (2013.01);
(Continued)

(58) Field of Classification Search
CPC .... G02B 27/0172; G02B 5/10; G02B 6/0031; G02B 6/0045; G02B 6/0055;
(Continued)

(56) References Cited

U.S. PATENT DOCUMENTS 11,668,935 B2 * 6/2023 Bablumyan .............. G02B 5/32
359/13
2018/0284444 A1  10/2018  Matsuki et al.
(Continued)

FOREIGN PATENT DOCUMENTS

WO   2020232170 A1   11/2020

OTHER PUBLICATIONS

International Search Report and Written Opinion for International Application No. PCT/US2022/054083, mailed May 12, 2023, 9 pages.
(Continued)

*Primary Examiner* — Henry Duong
(74) *Attorney, Agent, or Firm* — Greenberg Traurig, LLP

(57) ABSTRACT

A device is provided. The device includes a light guide having a curved surface. The device also includes an out-coupling element coupled with the light guide at an output portion of the light guide. The device further includes a reflective layer disposed at the output portion of the light guide. The out-coupling element is configured to couple a first ray propagating inside the light guide out of the light guide as a plurality of second rays propagating in non-parallel directions toward the reflective layer. The reflective layer is configured to reflect the plurality of second rays as a plurality of third rays propagating in parallel directions toward the out-coupling element and the light guide.

20 Claims, 13 Drawing Sheets

(52) U.S. Cl.
CPC ......... *G02B 6/0045* (2013.01); *G02B 6/0055* (2013.01); *G02B 2027/013* (2013.01)

(58) Field of Classification Search
CPC ...... G02B 2027/013; G02B 2027/0112; G02B 27/0081; G02B 2027/0125; G02B 2027/0174; G02B 2027/0178; G02B 27/01; G02B 27/0101; G02B 27/0103; G02B 27/0149; G02B 27/0176; G02B 27/0179; G02B 2027/0105; G02B 27/0189; G02B 2027/0107; G02B 2027/0109; G02B 27/017; G02B 2027/011; G02B 2027/0114; G02B 2027/0116; G02B 2027/0118; G02B 2027/012; G02B 2027/0121; G02B 2027/0123; G02B 2027/0127; G02B 2027/0129; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC ........................................................ 359/630
See application file for complete search history.

(56) References Cited

U.S. PATENT DOCUMENTS

2018/0299678 A1\* 10/2018 Singer ................... G02B 6/005
2019/0072767 A1\* 3/2019 Vallius .................. H04N 9/646
2020/0166753 A1 5/2020 Vallius et al.

OTHER PUBLICATIONS

International Preliminary Report on Patentability for International Application No. PCT/US2022/054083, mailed Jul. 11, 2024, 8 pages.

\* cited by examiner

CURVED LIGHT GUIDE IMAGE COMBINER AND SYSTEM INCLUDING THE SAME

CROSS REFERENCE TO RELATED APPLICATIONS

This application claims the benefit of priority to U.S. Provisional Application No. 63/295,835, filed on Dec. 31, 2021, and to U.S. Provisional Patent Application No. 63/345,026, filed on May 23, 2022. The contents of the above-referenced applications are incorporated by reference in their entirety.

TECHNICAL FIELD

The present disclosure relates generally to optical devices and, more specifically, to a curved light guide image combiner and a system including the same.

BACKGROUND

An artificial reality system, such as a head-mounted display ("HMD") or heads-up display ("HUD") system, generally includes a near-eye display ("NED") system in the form of a headset or a pair of glasses, and configured to present content to a user via an electronic or optic display within, for example, about 10-20 mm in front of the eyes of a user. The NED system may display virtual objects or combine images of real objects with virtual objects, as in virtual reality ("VR"), augmented reality ("AR"), or mixed reality ("MR") applications. For example, in an AR system, a user may view both images of virtual objects (e.g., computer-generated images ("CGIs")) and the surrounding environment by, for example, seeing through transparent display glasses or lenses (also referred to as an optical see-through AR system). One example of an optical see-through AR system is a pupil-expansion light guide display system, in which an image light representing a CGI may be coupled into a light guide (e.g., a transparent substrate) to propagate inside the light guide, and be coupled out of the light guide at different locations to expand an effective pupil.

SUMMARY OF THE DISCLOSURE

Consistent with an aspect of the present disclosure, a device is provided. The device includes a light guide having a curved surface. The device also includes an out-coupling element coupled with the light guide at an output portion of the light guide. The device further includes a reflective layer disposed at the output portion of the light guide. The out-coupling element is configured to couple a first ray propagating inside the light guide out of the light guide as a plurality of second rays propagating in non-parallel directions toward the reflective layer. The reflective layer is configured to reflect the plurality of second rays as a plurality of third rays propagating in parallel directions toward the out-coupling element and the light guide.

Consistent with another aspect of the present disclosure, a device is provided. The device includes a light guide having a curved surface. The device also includes an in-coupling element and a first reflective layer disposed at an input portion of the light guide. The device also includes an out-coupling element and a second reflective layer disposed at an output portion of the light guide. The first reflective layer is configured to reflect a bundle of parallel input rays of an image light received from a light source as a bundle of non-parallel input rays propagating toward the in-coupling element. The in-coupling element is configured to couple the bundle of non-parallel input rays into the light guide as a bundle of parallel in-coupled rays. The out-coupling element is configured to couple each parallel in-coupled ray in the bundle of parallel in-coupled rays out of the light guide as a plurality of non-parallel output rays propagating toward the second reflective layer. The second reflective layer is configured to reflect the plurality of non-parallel output rays back to the light guide as a plurality of parallel output rays, the parallel output rays being transmitted through the out-coupling element and the light guide.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
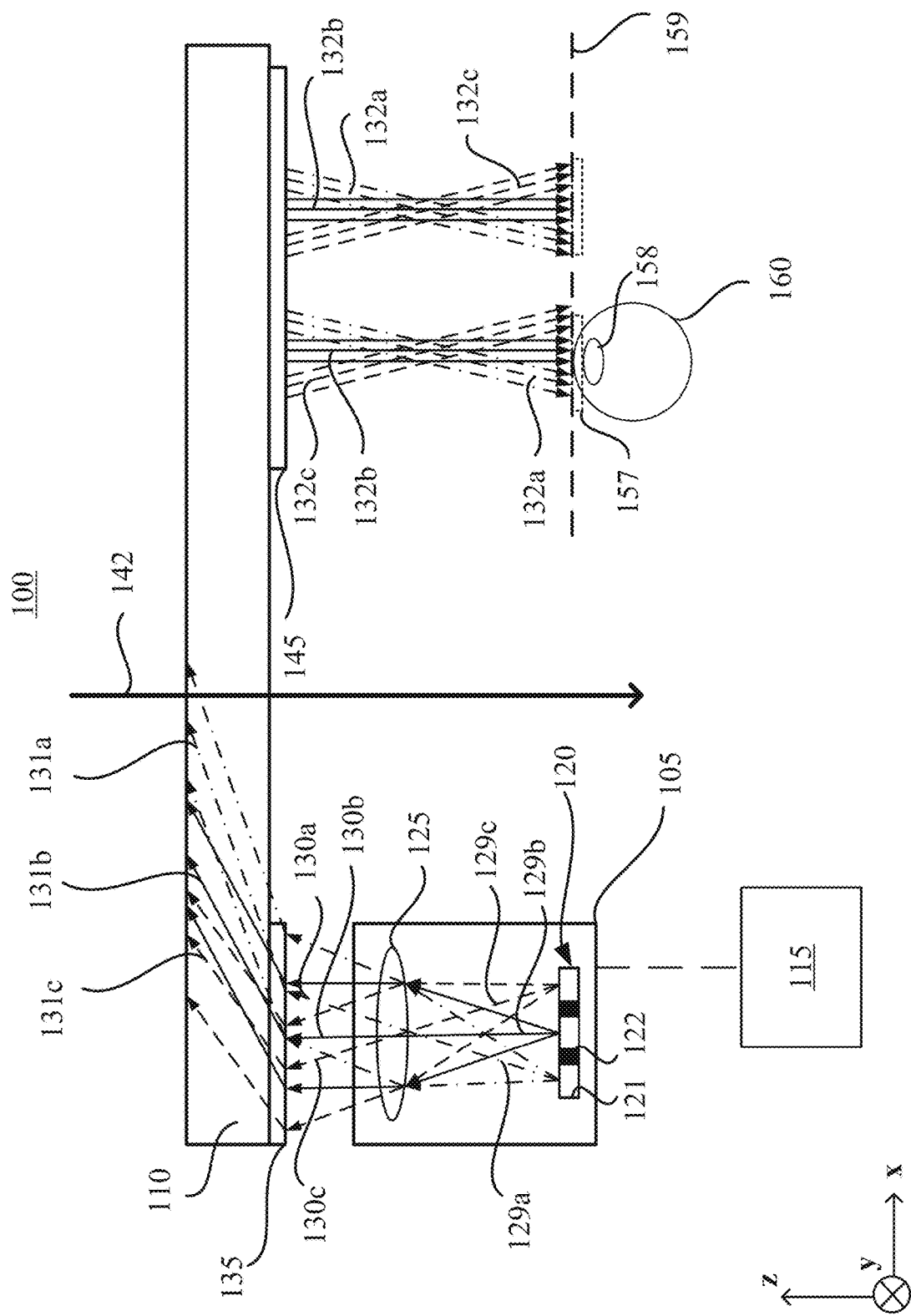
FIGS. 1A and 1B schematically illustrate a diagram of a conventional flat light guide display system implemented in a near-eye display ("NED")

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a light means that a major portion, including all, of a light is transmitted, reflected, diffracted, or blocked, etc. The major portion may be a predetermined percentage (greater than 50%) of the entire light, such as 100%, 98%, 90%, 85%, 80%, etc., which may be determined based on specific application needs.

The term "orthogonal" as used in "orthogonal polarizations" or the term "orthogonally" as used in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

Figure 1B:
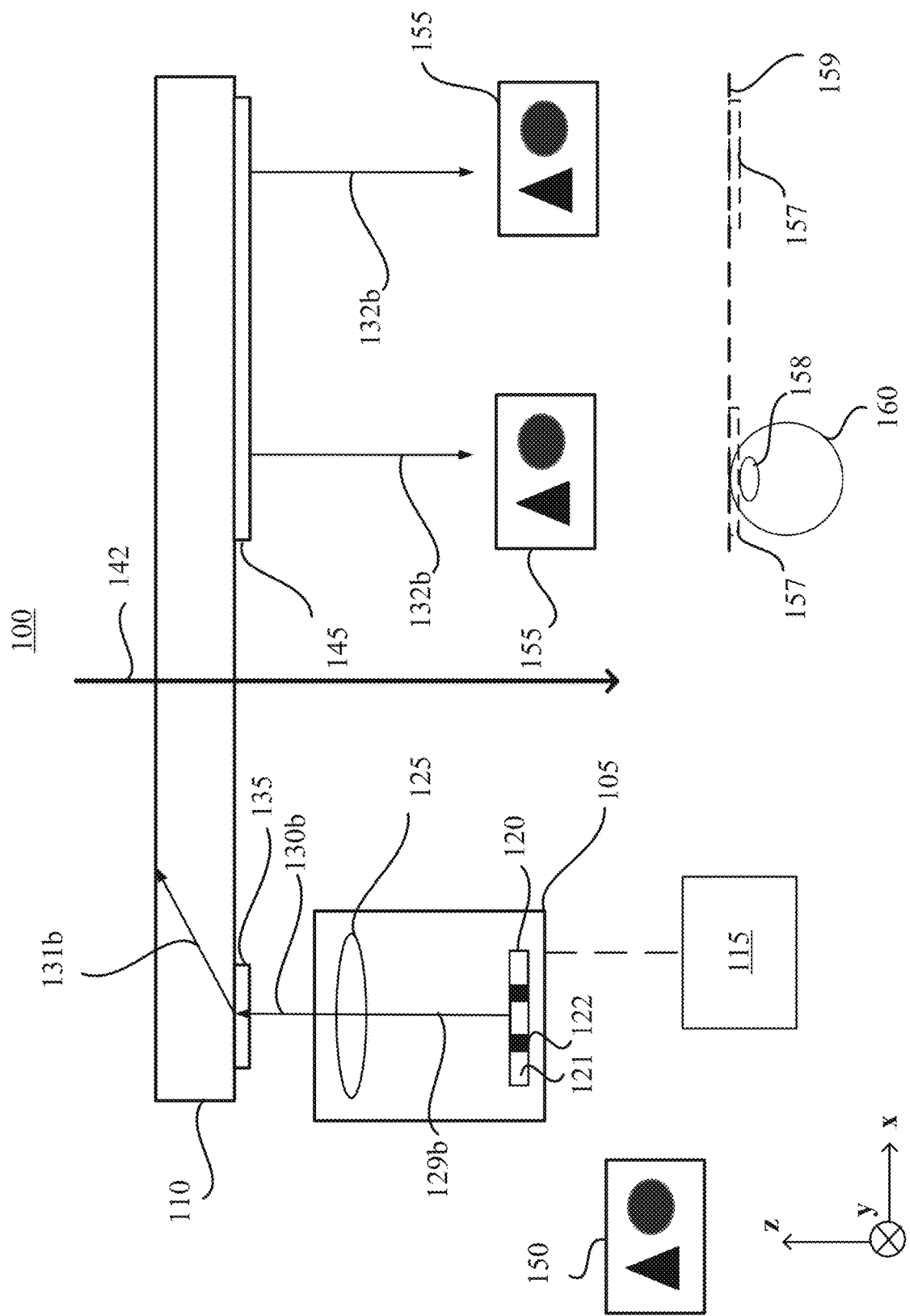

An AR or MR device may include an image combiner that combines an image light representing a virtual object and a light from a real world environment, such that the user may perceive the virtual object superimposed on the real world scene through the image combiner. An example image combiner that is often implemented in AR or MR devices is a light guide image combiner. FIGS. 1A and 1B illustrate x-z sectional views of a conventional light guide display system or assembly 100. As shown in FIG. 1A, the system 100 may include a light source assembly 105, a light guide 110, and a controller 115. The system 100 may also include an in-coupling element 135 and an out-coupling element 145 coupled to the light guide 110. The light source assembly 105 may output an image light 130 representing a virtual image, and the light guide 110 coupled with the in-coupling element 135 and the out-coupling element 145 may guide the image light 130 toward a plurality of exit pupils 157 positioned in an eye-box region 159 of the system 100.

As shown in FIG. 1A, the light source assembly 105 may include a display panel 120 and a collimating lens 125. The display panel 120 may include a plurality of pixels 121 arranged in an pixel array, in which neighboring pixels 121 may be separated by, e.g., a black matrix 122. The black matrix 122 may be a matrix of light absorbing or blocking materials. For illustrative purposes, FIG. 1A shows that the display panel 120 includes three pixels 121. The respective pixel 121 may output a bundle of divergent rays 129a, 129b, or 129c toward the collimating lens 125. For example, the bundles of divergent rays 129a, 129b, and 129c may be output from a left pixel 121, a central pixel 121, and a right pixel 121 of the display panel 120, respectively. The bundles of the rays 129a, 129b, and 129c may be collectively referred to as an image light 129 output from the display panel 120.

The collimating lens 125 may transform or convert a linear distribution of the pixels 121 in the display panel 120 into an angular distribution of the pixels 121 at the input side of the light guide 110. The collimating lens 125 may transform the image light 129 output from the display panel 120 with a predetermined linear size into an image light 130 with a predetermined input FOV (e.g., α). For example, the collimating lens 125 may convert the bundle of divergent rays 129a, 129b, or 129c of the image light 129 into a bundle of parallel rays 130a, 130b, or 130c of the image light 130. The bundle of rays 130a, 130b, and 130c may be collectively referred to as an input image light 130 of the light guide 110. The respective bundles of parallel rays 130a, 130b, and 130c may have different incidence angles relative to the light guide 110, representing different FOV directions of the input image light 130.

The light guide 110 coupled with the in-coupling element 135 and the out-coupling element 145 may replicate the input image light 130 at the output side, to expand an effective pupil of the system 100. For example, the in-coupling element 135 may couple the bundle of parallel rays 130a, 130b, or 130c as a bundle of parallel rays 131a, 131b, or 131c, which may propagate inside the light guide 110 via total internal reflection ("TIR"). The out-coupling element 145 may couple the bundle of parallel rays 131a, 131b, or 131c out of the light guide 110 as a plurality of bundles of parallel rays 132a, 132b, or 132c, which may propagate toward a plurality of exit pupils 157 positioned in an eye-box region 159 of the system 100.

For a simplified illustration, FIG. 1B shows the light propagation path of a single ray (e.g., central ray) of the bundle of divergent rays 129b of the image light 129, from the display panel 120 to the exit pupil 157. The parallel rays in the same bundle may have the same light propagation path from the display panel 120 to the exit pupil 157, while the parallel rays in different bundles may have different light propagation paths from the display panel 120 to the exit pupil 157. Referring to FIGS. 1A and 1, the collimating lens 125 may convert the bundle of divergent rays 129b into the bundle of parallel rays 130b that are normally incident onto the in-coupling element 135. Each ray (e.g., the central ray shown in FIG. 1B) of the bundle of parallel rays 130b may represent a predetermined FOV direction of the input FOV, e.g., the zero-degree FOV direction as shown in FIG. 1B.

As shown in FIG. 1B, the display panel 120 may generate the image light 129 representing a virtual image 150 having a predetermined image size associated with a size of the display panel 120. The collimating lens 125 may condition the image light 129 and output the input image light 130 having the input FOV (e.g., α) toward the light guide 110. The in-coupling element 135 may couple the image light 130 into the light guide 110 as the in-coupled image light 131. The out-coupling element 145 may couple the in-coupled image light 131 incident onto different portions of the out-coupling element 145 out of the light guide 110 as a plurality of output image lights 132, each of which may have an output FOV that may be substantially the same as the input FOV (e.g., α). For discussion purposes, FIG. 1B shows two output image lights 132, and shows a single ray (e.g., central ray) of each output image light 132. The two rays (e.g., central rays) of the respective output image lights 132 may be normally output from the out-coupling element 145, with parallel propagation directions. The ray (e.g., central ray) of each output image light 132 may represent the zero-degree FOV direction of the output FOV. FIG. 1B shows that the ray (e.g., central ray) of each output image light 132 propagates in the z-axis direction.

Each output image light 132 may represent or form an image 155 that may be substantially the same as (or may have the same image content as) the virtual image 150 output from the display panel 120. Thus, the light guide 110 coupled with the in-coupling element 135 and the out-coupling element 145 may replicate the image light 130 at the output side of the light guide 110, to expand an effective pupil of the system 100. The plurality of image lights 132 may propagate in parallel directions (as shown in FIG. 1B) toward the plurality of exit pupils 157 positioned in the eye-box region 159 of the system 100. For example, the output image lights 132 may one-to-one correspond to the exit pupils 157. The size of a single exit pupil 157 may be larger than and comparable with the size of the eye pupil 158. The exit pupils 157 may be sufficiently spaced apart, such that when one of the exit pupils 157 substantially coincides with the position of the eye pupil 158, the remaining one or more exit pupils 157 may be located beyond the position of the eye pupil 158 (e.g., falling outside of the eye 160).

The light guide 110 coupled with the in-coupling element 135 and the out-coupling element 145 may also be referred to as a light guide image combiner, e.g., a flat light guide image combiner. The light guide 110 may also transmit a light 142 from a real-world environment, combine the light 142 with the output image light 132 and deliver the combined light to the eye 160. Thus, the eye 160 may observe the virtual scene optically combined with the real world scene.

Figure 1D:
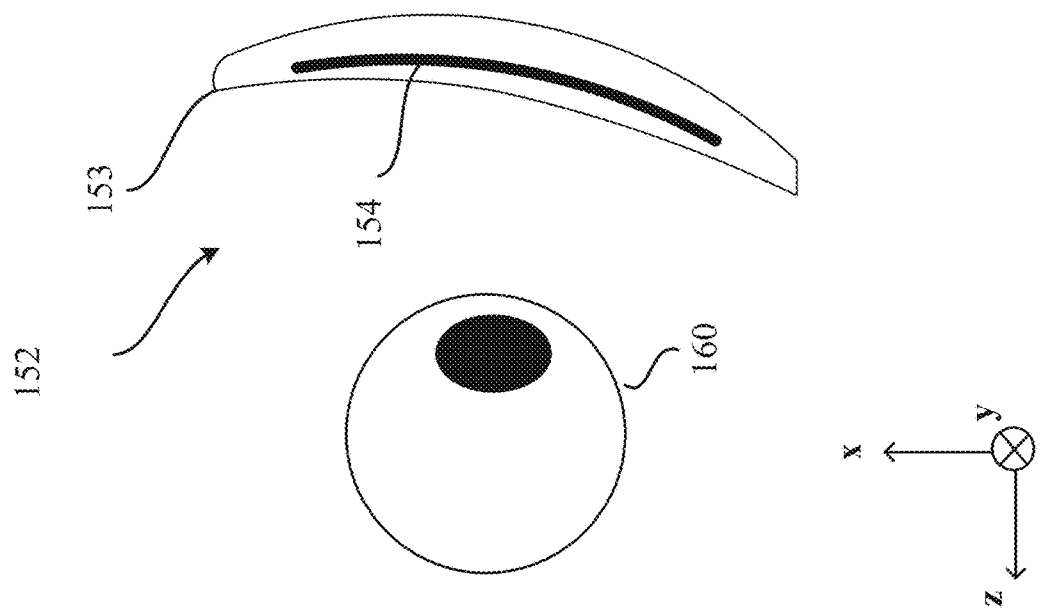
FIGS. 1C and 1D schematically illustrate diagrams of a curved image combiner implemented in an NED.
Figure 1C:
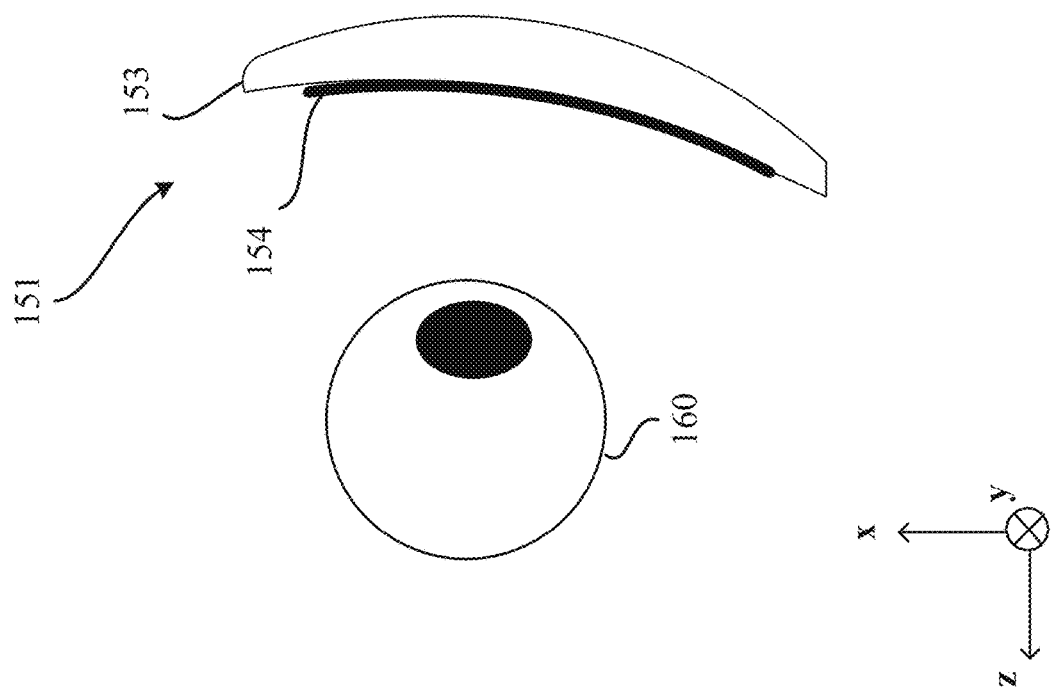

To be compatible with ophthalmic lenses or to have a cosmetic appearance, the image combiner (e.g., light guide image combiner) may have a curved shape. FIGS. 1C and 1D schematically illustrate diagrams of a curved image combiner 154 (e.g., a curved light guide image combiner) implemented in an NED. For illustrative purposes, the NED is simplified. That is, the NED shown in FIG. 1C and FIG. 1D may include other elements that are not shown. As shown in FIG. 1C, an NED 151 may include a lens 153 having a first surface facing the eye 160 of the user of the NED 151 and a second surface facing the real world environment. The lens 153 may be a curved ophthalmic lens for vision correction or a curved slab for cosmetic appearance. In the NED 151 shown in FIG. 1C, the curved image combiner 154 may be disposed at the first surface of the lens 153. For example, the curved image combiner 154 may be fabricated with a radius of curvature that substantially matches with the radius of curvature of the first surface of the lens 153. An image light representing a virtual image may be affected by the curvature of the first surface of the lens 153. In an NED 152 shown in FIG. 1D, the curved image combiner 154 may be disposed in the lens 153. An image light representing a virtual image may be affected by the curvature of the first surface of the lens 153 and the refractive index of the lens 153.

Figure 1E:
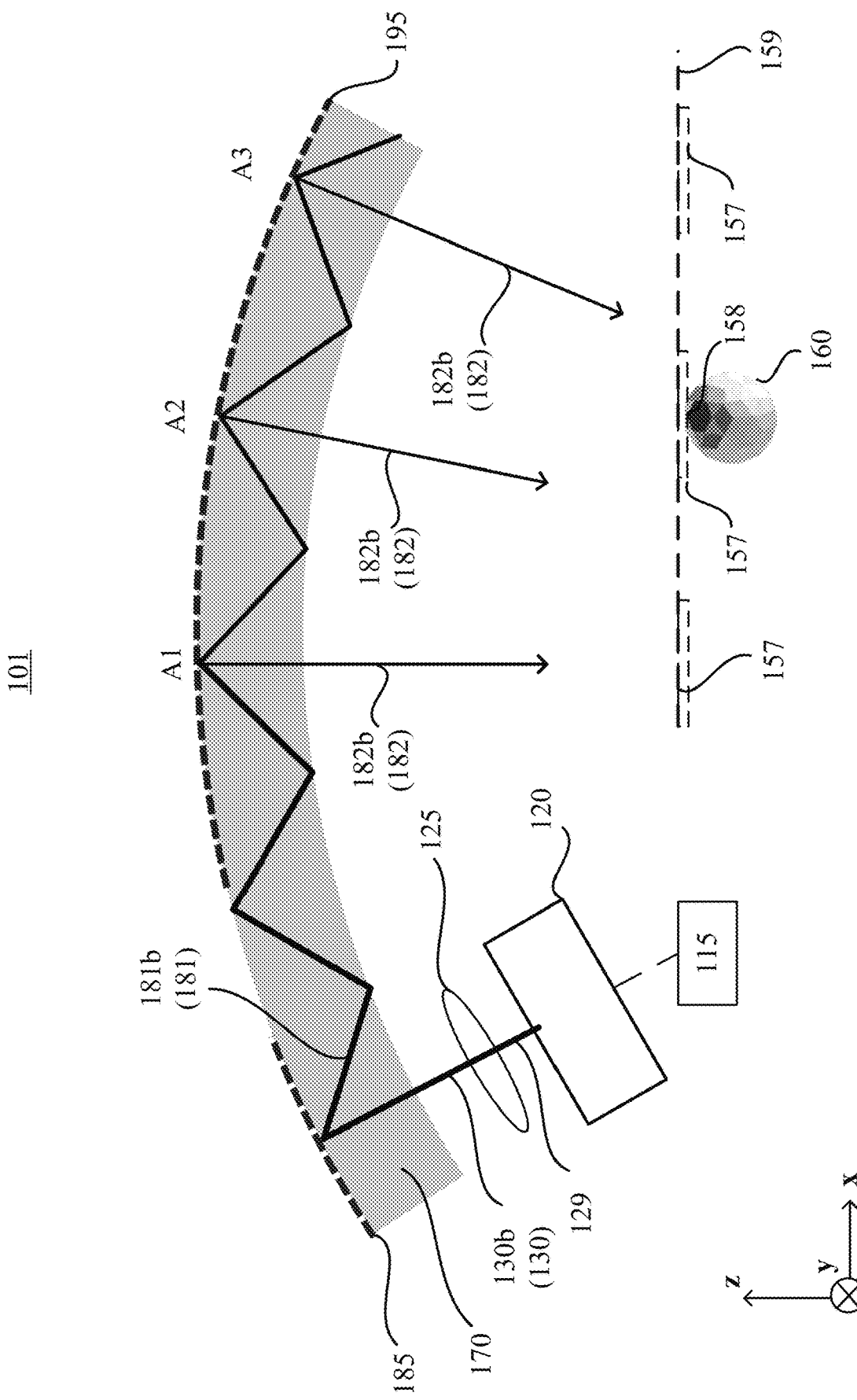
FIG. 1E schematically illustrates a diagram of a conventional curved light guide display system implemented in an NED.

A conventional curved image combiner presents issues when implemented into the NED. FIG. 1E schematically illustrates a diagram of a conventional curved light guide display system or assembly 101 implemented in an NED. As shown in FIG. 1E, the system 101 may include the display panel 120, the collimating lens 125, a curved light guide 170 coupled with an in-coupling element 185 and an out-coupling element 195, and the controller 115. The display panel 120 may output the image light 129 toward the collimating lens 125. The collimating lens 125 may transmit the image light 129 as the image light 130. The in-coupling element 185 and the out-coupling element 195 may be curved coupling elements, e.g., having a radius of curvature that is similar to the radius of curvature of the curved light guide 110. The in-coupling element 185 may couple the image light 130 into the light guide 170 as an in-coupled image light 181, which may propagate inside the light guide 170 toward the out-coupling element 195 via TIR. The out-coupling element 195 may couple the in-coupled image light 181 out of the light guide 110 as a plurality of output image lights 182, which may propagate toward the eye-box region 159 of the system 101.

For discussion purposes, FIG. 1E only shows a single ray (e.g., central ray) 130b of the image light 130 incident onto the in-coupling element 185, and the single ray of the image light 130 may represent the zero-degree FOV direction of the input FOV. For discussion purposes, FIG. 1E shows three output image lights 182, and shows a single ray (e.g., central ray) 182b of each output image light 182. The central rays 182b of the three output image lights 182 may be normally output from the respective portions (e.g., A1, A2, and A3) of the out-coupling element 195, with the respective propagation directions parallel with respective local normals of the surface of the curved light guide 170. Due to the curved light guide 170 and the curved out-coupling element 195, the central rays 182b of the three output image lights 182 may not have parallel propagation directions, but may propagate convergently (i.e., in non-parallel directions) toward the eye-box region 159. For example, FIG. 1E shows that none of the central rays 182b propagates in the z-axis direction. The convergence of the three central rays 182b toward the eye-box region 159 may cause image formation errors at the exit pupils 157 within the eye-box region 159. For example, the eye 160 positioned within the eye-box region 159 may observe a blurry image, or an image with a low contrast ratio.

Figure 2A:
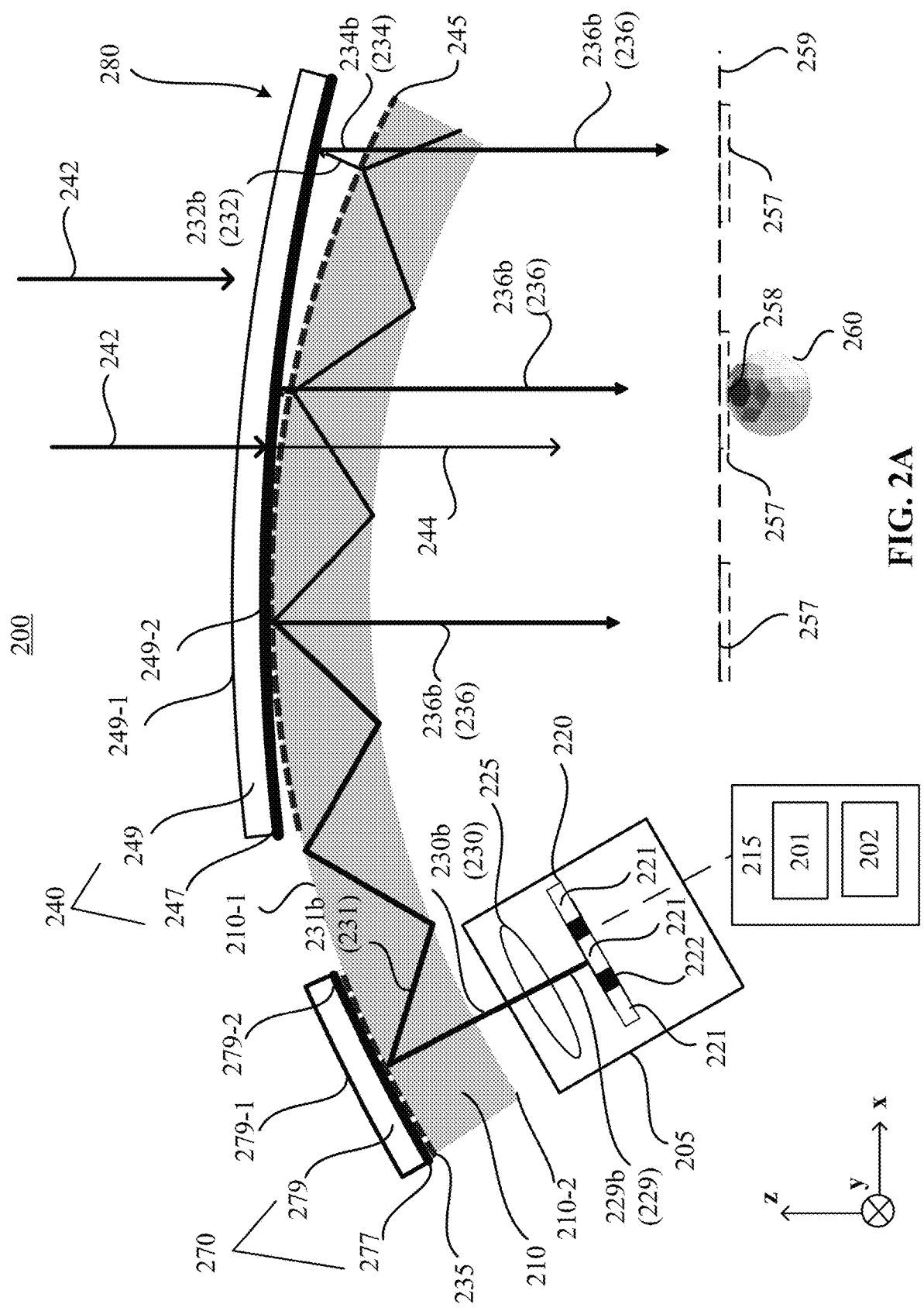
FIG. 2A schematically illustrates a diagram of a curved light guide display assembly, according to an embodiment of the present disclosure.

In view of the limitations in the conventional technologies, the present disclosure provides a curved light guide image combiner with an improved image performance. The present disclosure also provides a system including the curved light guide image combiner. FIG. 2A illustrates a schematic diagram of a curved light guide display system or assembly 200, according to an embodiment of the present disclosure. As shown in FIG. 2A, the curved light guide display system 200 may include a light source assembly 205, a curved light guide 210 coupled with an in-coupling element (or input coupler) 235, an out-coupling element (or output coupler) 245, a first reflector 270, a second reflector 240, and a controller 215. The curved light guide 210 coupled with the input coupler 235, the output coupler 245, the first reflector 270, and the second reflector 240 may also be referred to as a curved light guide image combiner 280. The light source assembly 205 may be configured to output an image light 230 representing a virtual image, and the curved light guide image combiner 280 may be configured to guide the image light 230 to propagate through a plurality of exit pupils 257 positioned in an eye-box region 259 of the system 200. The exit pupil 257 may be a spatial location in the eye-box region 259 where an eye pupil 258 of an eye 260 of a user of the system 200 may be positioned to receive the content of the virtual image generated by the light source assembly 205. The controller 215 may include a processor 201 and a data storage device 202. The processor 201 may be any suitable processor, such as a CPU, GPU, etc., which may have data processing capability. The data storage device 202 may be a non-transitory computer-readable medium, such as a hard disk, a memory, a flash drive, etc. The data storage device 202 may storage various data.

The light source assembly 205 may include a display element 220 and a collimating lens 225. The display element 220 may include a display panel, such as a liquid crystal display ("LCD") panel, a liquid-crystal-on-silicon ("LCoS") display panel, an organic light-emitting diode ("OLED") display panel, a micro-OLED display panel, a light-emitting diode ("LED") display panel, a micro light-emitting diode ("micro-LED") display panel, a laser scanning display panel, a digital light processing ("DLP") display panel, or a combination thereof. In some embodiments, the display element 220 may include a self-emissive panel (including a plurality of self-emissive light sources or light emitting units), such as an OLED display panel, a micro-OLED display panel, an LED display panel, a micro-LED display panel, or a laser scanning display panel. In some embodiments, the display element 220 may include a display panel that is illuminated by an external source, such as an LCD panel, an LCoS display panel, or a DLP display panel. Examples of an external source may include a laser diode, a vertical cavity surface emitting laser, a light emitting diode, or a combination thereof.

For discussion purposes, FIG. 2A shows that the display panel includes a plurality of pixels 221 arranged in an pixel array, in which neighboring pixels 221 may be separated by, e.g., a black matrix 222. For illustrative purposes, FIG. 2A shows that the display element 220 includes three pixels 221. For displaying full colors, the pixels 221 may include red ("R") pixels (or sub-pixels), green ("G") pixels (or sub-pixels), and blue ("B") pixels (or sub-pixels). In some embodiments, the pixels 221 may include pixels (or sub-pixels) other than or in combination with one or more of the red ("R") pixels (or sub-pixels), green ("G") pixels (or sub-pixels), or blue ("B") pixels (or sub-pixels).

In some embodiments, the display panel included in the display element 220 may include one or more narrowband light sources, e.g., outputting narrowband blue, green, and red image lights each having a bandwidth (full width at half maximum (FWHM)) within a range of about 5 nm to 10 nm, a range of about 10 nm to 20 nm, a range of about 20 nm to 30 nm, or a range of about 30 nm to 40 nm, etc. For example, a micro-LED display panel may be configured to emit blue, green, and red image lights each having a bandwidth of about 20 nm. A laser scanning display panel may be configured to emit blue, green, and red image lights each having a bandwidth of several nanometers, e.g., 5 nm.

The display element 220 may output an image light 229 toward the collimating lens 225. The image light 229 may represent a virtual image having a predetermined image size. For example, each pixel 221 may output a bundle of divergent rays toward the collimating lens 225, and the respective bundle of divergent rays output from respective pixels 221 may form the image light 229. For discussion purposes, FIG. 2A only shows a single ray 229b of the of the image light 229, e.g., a central ray of a bundle of divergent rays output from the central pixel 221 of the display element 220. The parallel rays in the same bundle may have the same light propagation path from the display panel 220 to the exit pupil 257, while the parallel rays in different bundles may have different light propagation paths from the display panel 220 to the exit pupil 257.

The collimating lens 225 may be configured to condition the image light 229 to output an image light 230 having a predetermined input FOV (e.g., a) toward the curved light guide 210. The collimating lens 225 may transform a linear distribution of pixels in the virtual image formed by the image light 229 into an angular distribution of pixels in the image light 230 having the predetermined input FOV. For example, the collimating lens 225 may convert the respective bundles of divergent rays output from the respective pixels 221 into respective bundles of parallel rays representing respective FOV directions of the input FOV. For discussion purposes, FIG. 2A only shows a single ray (e.g., central ray) 230b of the image light 230, which is converted from the central ray 229b of the bundle of divergent rays output from the central pixel 221 of the display element 220.

The central ray 230b of the image light 230 may represent the zero-degree FOV direction of the input FOV.

The curved light guide 210 may have a first surface 210-1 facing a real world environment, and a second surface 210-2 opposite to the first surface 210-1 and facing the eye 260 of a user of the system 200 (or facing the eye-box 259). The first surface 210-1 may be configured with a radius of curvature $R_1$, which is also referred to as an outer radius of curvature $R_1$ of the curved light guide 210. For discussion purposes, the first surface 210-1 is presumed to have a uniform radius of curvature $R_1$, although the principle disclosed herein may be applied to embodiments where the first surface 210-1 have different radii of curvature at different points or portions, such as, for example, when the first surface 210-1 is aspherical. The second surface 210-2 may be configured with a radius of curvature $R_2$, which is also referred to as an inner radius of curvature $R_2$ of the curved light guide 210. For discussion purposes, the second surface 210-2 is presumed to have a uniform radius of curvature $R_2$, although the principle disclosed herein may be applied to embodiments where the second surface 210-2 has different radii of curvature at different points or portions, such as, for example, when the second surface 210-2 is aspherical.

For illustrative purposes, the light guide 210 is shown as having a spherical shape and the first surface 210-1 and the second surface 210-2 are shown as concentrical surfaces. The same principle disclosed herein may be applied to embodiments where the light guide 210 has an aspherical shape. In some embodiments, the first surface 210-1 and the second surface 210-2 may not be concentric spherical surfaces. For discussion and illustrative purposes, the first surface 210-1 and the second surface 210-2 are presumed to be concentric spherical surfaces. It is noted that the same principle disclosed herein may also be applied to embodiments where the first surface 210-1 and the second surface 210-2 are non-concentric spherical surfaces. The inner radius of curvature $R_2$ is smaller than the outer radius of curvature $R_1$. The curved light guide 210 may include one or more materials configured to facilitate the TIR of an image light inside the curved light guide 210. The material of the curved light guide 210 may be optically transparent in an operation wavelength of the system 100, e.g., a visible wavelength range and/or an infrared wavelength range. The curved light guide 210 may include, for example, a plastic, a glass, and/or polymers.

In some embodiments, the input coupler 235 may be disposed at a first portion (e.g., an input portion) of the curved light guide 210. In some embodiments, the entire input coupler 235 may be in direct contact with a curved surface of the curved light guide 210, such as the first surface 210-1. That is, the input coupler 235 may have a curved shape, which may match a curved shape of the curved surface (e.g., first surface 210-1) of the curved light guide 210. Substantially the entire input coupler 235 may follow the curved shape of the curved surface of the curved light guide 210. In some embodiments, to increase bonding, there may be a thin layer of optically clear adhesive located between the input coupler 235 and the curved surface of the curved light guide 210. The first reflector 270 and the input coupler 235 may be disposed at a same input portion of the light guide 210, either at a same side of the curved light guide 210 (e.g., both being disposed at the first surface 210-1, or the second surface 210-2), or at opposite sides of the curved light guide 210 (e.g., one at the first surface 210-1, the other at the second surface 210-2). In either configuration, the location of the first reflector 270 may be referred to as being corresponding to the location of the input coupler 235. The sizes (or areas) of the first reflector 270 and the input coupler 235 may be substantially the same, or the size of the first reflector 270 may be greater than the size of the input coupler 235.

In some embodiments, the first reflector 270 may be stacked with the input coupler 235, and disposed at an outer side of the input coupler 235, as shown in FIG. 2A (e.g., a side that faces the real world environment). The total area of the first reflector 270 may be substantially the same as or at least comparable with the total area of the input coupler 235. As further explained below, the first reflector 270 may be tangent with the input coupler 235. In some embodiments, only a small portion (or area) of the first reflector 270 being in direct contact with the input coupler 235, and the remaining major portions (or areas) of the first reflector 270 being separated from the input coupler 235 with a space or gap. In some embodiments, the small portion (or area) may be less than 5%, 4%, 3%, 2%, 1%, 0.5%, 0.4%, 0.3%, 0.2%, or 0.1% of the total area of the first reflector 270. It is noted that due to the limited space in FIG. 2A, the tangent configuration is not visible in FIG. 2A.

In some embodiments, to assist with bonding, a thin layer of optically clear adhesive may be present at the small portion (or area) between the first reflector 270 and the input coupler 235. In some embodiments, due to the tangent configuration, the small portion (or area) of the first reflector 270 may be in indirect contact with the input coupler 235 through the thin layer of optically clear adhesive, and the remaining major portions or areas of the first reflector 270 may be separated from the input coupler 235 by a space or gap. In some embodiments, to assist with bonding, a thin layer of optically clear adhesive may be present between the entire first reflector 270 and the input coupler 235. The refractive index of the optically clear adhesive may be smaller than a refractive index of the waveguide 210. That is, the optically clear adhesive may fill the space between the first reflector 270 and the input coupler 235.

The input coupler 235 may be configured to be polarization selective, such that a light having a first polarization (e.g., a right-handed circular polarization) is transmitted through the input coupler 235 without being deflected, and a light having a second, orthogonal polarization (e.g., a left-handed circular polarization) is coupled (e.g., deflected) into the curved light guide 210. Thus, the image light 230 configured with the first polarization may transmit through the input coupler 235 toward the first reflector 270 located at the outer side of the input coupler 235, without being coupled (e.g., deflected) into the light guide 210 via the input coupler 235. The first reflector 270 may be configured to reflect the image light 230 having the first polarization back to the input coupler 235 while changing the first polarization to the second polarization. The input coupler 235 may then couple, e.g., via forward diffraction, the image light 230 having the second polarization into a TIR path inside the curved light guide 210 as an in-coupled image light 231 (or TIR propagating image light 231). For discussion purposes, FIG. 2A only shows a single ray (e.g., central ray) 231$b$ of the image light 231, which is converted from the central ray 230$b$. The details of reflecting the image light 230 via the first reflector 270 and coupling the image light 230 into the curved light guide 210 via the input coupler 235 will be explained with reference to FIG. 2C.

The in-coupled image light 231 may propagate inside the curved light guide 210 toward the output coupler 245 via TIR. For example, the output coupler 245 may be disposed at a second portion (e.g., an output portion) of the curved light guide 210. In some embodiments, the output coupler 245 may be in direct contact with a curved surface (e.g., first surface 210-1) of the curved light guide 210. The output coupler 245 may have a curved shape, which may match the curved shape of the curved surface of the curved light guide 210. In some embodiments, the entire curved output coupler 245 may be in direct contact with the curved surface of the curved light guide 210. The first portion (input portion) and the second portion (output portion) may be located at different locations of the curved light guide 210.

When a light ray (or a ray) propagates within the curved light guide 210 through TIR, the angle formed by the TIR path of the light ray and the local normal of the surface of the curved light guide 210 (or the incidence angle of the light ray incident onto the inner surface of the curved light guide 210) may be referred to as a TIR guided angle or a TIR propagation angle. In some embodiments, the TIR propagation angle of the in-coupled ray 231$b$ may be maintained to be substantially the same when the in-coupled ray 231$b$ propagates inside the curved light guide 210 toward the output coupler 245 via TIR.

The second reflector 240 and the output coupler 245 may be disposed at a same output portion of the light guide 210, either at a same side of the curved light guide 210 (both being disposed at the first surface 210-1 or the second surface 210-2), or at opposite sides of the curved light guide 210 (e.g., one being disposed at the first surface 210-1, the other being disposed at the second surface 210-2). In either configuration, the location of the second reflector 240 may be referred to as being corresponding to the location of the output coupler 245. The sizes (or areas) of the second reflector 240 and the output coupler 245 may be substantially the same, or the size of the second reflector 240 may be greater than the size of the output coupler 245.

The output coupler 245 may be configured to deflect (e.g., diffract) the in-coupled image light 231 out of the curved light guide 210, as a plurality of output image lights 232 propagating toward the second reflector 240. The second reflector 240 may reflect the output image lights 232 as a plurality of image lights 234 back toward the output coupler 245 and the light guide 210, propagating toward the eye-box region 259. For example, the image lights 234 may propagate through the output coupler 245 and the waveguide 210 without changing the propagation directions toward the eye-box region 259. That is, the output coupler 245 and the waveguide 210 may substantially maintain the propagation directions of the image lights 234, while transmitting the image lights 234.

In the disclosed embodiments, the output coupler 245 may be configured to deflect (e.g., diffract) the in-coupled ray 231$b$ out of the curved light guide 210, as a plurality of output rays 232$b$ propagating in non-parallel directions toward the second reflector 240 (hence the output rays 232$b$ may be referred to as non-parallel output rays 232$b$), instead of being configured to deflect the in-coupled ray 231$b$ directly out of the curved light guide 210 as a plurality of output rays propagating in non-parallel directions toward the eye-box region 259. The second reflector 240 may reflect the non-parallel output rays 232$b$ back to the output coupler 245 as a plurality of rays 234$b$ propagating in parallel directions (hence the image rays 234 may be referred to as parallel rays 234$b$) toward the eye-box region 259. The details of coupling the in-coupled image light 231 out of the curved light guide 210 via the output coupler 245, and reflecting the output image lights 232 via the second reflector 240 will be explained with reference to FIG. 2D.

In some embodiments, each of the input coupler 235 and the output coupler 245 may be formed or disposed at (e.g., affixed to) the first surface 210-1 or the second surface 210-2 of the curved light guide 210. In some embodiments, each of the input coupler 235 and the output coupler 245 may be integrally formed as a part of the curved light guide 210, or may be a separate element coupled to (e.g., attached to) the curved light guide 210. Because substantially the entire input coupler 235 and the entire output coupler 245 follow the curved shape of the curved light guide 210, and because the thicknesses of the input coupler 235 and the output coupler 245 are presumed to be negligible as compared to the thickness of the curved light guide 210, the radius of curvature of each of the curved input coupler 235 and the curved output coupler 245 is presumed to be substantially the same as the radius of curvature of the corresponding surface (210-1 or 210-2) of the curved light guide 210 on which each of the input coupler 235 and the out coupler 245 is formed or disposed. For discussion purposes, FIG. 2A shows that the input coupler 235 and the output coupler 245 are formed or disposed at (e.g., affixed to) the same surface, e.g., the first surface 210-1 of the curved light guide 210. The radius of curvature of each of the input coupler 235 and the output coupler 245 may be substantially the same as the radius $R_1$ of the first surface 210-1.

In some embodiments, although not shown, the input coupler 235 and the output coupler 245 may be formed or disposed at (e.g., affixed to), and may be in direct contact with, the second surface 210-2 of the curved light guide 210. The input coupler 235 and the output coupler 245 may follow the curved shape of the second surface 210-2. The radius of curvature of each of the input coupler 235 and the output coupler 245 may be substantially the same as the radius $R_2$ of the second surface 210-2. In some embodiments, the input coupler 235 and the output coupler 245 may be formed or disposed at (e.g., affixed to) different surfaces of the curved light guide 210. For example, the input coupler 235 may be disposed at the first surface 210-1 and may have the same radius of curvature as the first surface 210-1, and the output coupler 245 may be disposed at the second surface 210-2 and may have the same radius of curvature as the second surface 210-2.

In some embodiments, at least one (e.g., each) of the input coupler 235 or the output coupler 245 may include one or more diffraction gratings, one or more cascaded reflectors, one or more prismatic surface elements, an array of holographic reflectors, or any combination thereof. At least one (e.g., each) of the input coupler 235 or the output coupler 245 may be active or passive, and may be polarization sensitive (or polarization selective, polarization dependent) or polarization insensitive (or polarization non-selective, polarization independent). Examples of diffraction gratings may include a holographic polymer-dispersed liquid crystal ("H-PDLC") grating, a surface relief grating, a volume hologram, a polarization selective grating, a liquid crystal polarization hologram ("LCPH") grating based on liquid crystals ("LCs") (such as a Pancharatnam-Berry phase ("PBP") grating, a polarization volume hologram ("PVH") grating, etc.), a polarization hologram grating based on a birefringent photo-refractive holographic material other than LCs, a metasurface grating, etc. The diffraction grating may be a reflective or transmissive grating. The diffraction grating may be a passive or active grating. The diffraction grating may be polarization sensitive (or polarization selective) or polarization insensitive (or polarization non-selective). When the input coupler 235 or the output coupler 245 is configured to include or as a polarization selective grating, the input coupler 235 or the output coupler 245 may transmit a light having a predetermined polarization with negligible diffraction, and diffract a light having a polarization that is orthogonal to the predetermined polarization.

The first reflector 270 may be a curved reflector that is disposed at the input portion of the curved light guide 210. The curved light guide 210 may have an outer side facing the real world environment, and an inner side facing the eye 260 or the eye-box region 259. For discussion purposes, FIG. 2A shows that the input coupler 235 is disposed at the first surface 210-1 of the curved light guide 210, and is located between the first reflector 270 and the first surface 210-1 of the curved light guide 210. In some embodiments, although not shown, the input coupler 235 may be disposed at the second surface 210-2 of the curved light guide 210, and the first reflector 270 may be disposed at the first surface 210-1 of the curved light guide 210.

The first reflector 270 may include a first reflective layer 277 configured to reflect a light transmitted through the input coupler 235 back to the input coupler 235. In some embodiments, the first reflector 270 may include a first substrate 279 for supporting and protecting the first reflective layer 277. In some embodiments, the first reflector 270 may not include the first substrate 279, and the first reflective layer 277 may have a sufficient rigidity, e.g., may be a free-standing layer. When the first reflector 270 includes the first substrate 279, the first substrate 279 may be optically transparent in the operation wavelength of the system 200 (e.g., a visible wavelength range and/or an infrared wavelength range). The first substrate 279 may include a first surface (outer surface) 279-1 facing the real world environment, and a second surface 279-2 (inner surface) opposing to the first surface 279-1 and facing the curved light guide 210. The first reflective layer 277 may be disposed at the second surface 279-2 facing the curved light guide 210. The first reflective layer 277 may face the outer side of the curved light guide 210. The first reflective layer 277 may be a curved layer configured with a radius of curvature $R_3$. When the first reflector 270 also includes the first substrate 279, the inner surface 279-1 of the first substrate 279 may also be configured with the same radius of curvature $R_3$. In some embodiments, the radius of curvature $R_3$ of the first reflective layer 277 may be configured to be about two times the outer radius of curvature $R_1$ of the curved light guide 210, e.g., $R_3$ is about $2*R_1$.

The first reflective layer 277 may be disposed tangent to the curved light guide 210. In some embodiment, as shown in FIG. 2A, when both of the first reflector 270 and the input coupler 235 are disposed at the first surface 210-1 of the curved light guide 210, the input coupler 235 may be located between the first reflector 270 and the first surface 210-1 of the curved light guide 210. The entire input coupler 235 may be in direct contact with the first surface 210-1. The input coupler 235 may have a curved shape, which may follow the curve of the curved first surface 210-1. In some embodiments, substantially the entire input coupler 235 may follow the curve of the curved first surface 210-1. It is presumed that the radius of curvature of the input coupler 235 is the same as the radius of curvature of the first surface 210-1. Due to the different radii of curvature between the first reflective layer 277 and the input coupler 235, in some embodiments of the tangent configuration, only a small portion or area of the first reflective layer 277 may be in direct contact with the input coupler 235. The remaining major portions or areas of the first reflective layer 277 may be separated from the input coupler 235 by a space or gap. In some embodiments, the small portion or area may be less than 5%, 4%, 3%, 2%, 1%, 0.5%, 0.4%, 0.3%, 0.2%, or 0.1% of the total area of the first reflective layer 277. It is understood that due to the limited space in FIG. 2A, the tangent configuration is not visible in FIG. 2A.

In some embodiments, to increase bonding between the first reflective layer 277 and the input coupler 235, there may be a thin layer of optically clear adhesive located at the small portion or area between the first reflective layer 277 and the input coupler 235. In some embodiments, in the tangent configuration, the small portion (or area) of the first reflective layer 277 may be in indirect contact with the input coupler 235 through the thin layer of optically clear adhesive, and the remaining major portions or areas of the first reflective layer 277 may be separated from the input coupler 235 by a space or gap. In some embodiments, to assist with bonding, a thin layer of optically clear adhesive may be present between the entire first reflective layer 277 and the input coupler 235. The refractive index of the optically clear adhesive may be smaller than the refractive index of the waveguide 210. That is, the optically clear adhesive may fill the space between the first reflective layer 277 and the input coupler 235.

In some embodiments, when the input coupler 235 is disposed at the second surface 210-2 of the curved light guide 210, and the first reflective layer 277 is disposed at the first surface 210-1 of the curved light guide 210, due to the different radii of curvature between the first reflective layer 277 and the first surface 210-1 of the curved light guide 210, only a small portion or area of the first reflective layer 277 (rather than the entire first reflective layer 277) may be in direct contact with the first surface 210-1 of the curved light guide 210. In some embodiments, the small portion (or area) may be less than 5%, 4%, 3%, 2%, 1%, 0.5%, 0.4%, 0.3%, 0.2%, or 0.1% of the total area of the first reflective layer 277. That is, the first reflective layer 277 may be disposed tangent to the first surface 210-1. The remaining major portions (or areas) of the first reflective layer 277 may be separated from the first surface 210-1 by a gap or space.

In some embodiments, to increase bonding, there may be a thin layer of optically clear adhesive at the small portion or area between the first reflective layer 277 and the first surface 210-1 of the curved light guide 210. In the tangent configuration, in some embodiments, the small portion or area of the first reflective layer 277 may be in indirect contact with the first surface 210-1 through the thin layer of optically clear adhesive, and the remaining major portions or areas of the first reflective layer 277 may be separated from the first surface 210-1 of the curved light guide 210 by a space or gap. In some embodiments, to assist with bonding, a thin layer of optically clear adhesive may be present between the entire first reflective layer 277 and the light guide 210. The refractive index of the optically clear adhesive may be smaller than the refractive index of the waveguide 210. That is, the optically clear adhesive may fill the space between the first reflective layer 277 and the first surface 210-1 of the waveguide 210.

The second reflector 240 may be a curved reflector that is disposed at the second portion (e.g., the output portion) of the curved light guide 210. The second reflector 240 may be disposed at the outer side of the curved light guide 210 facing the real world environment. The second reflector 240 may include a second reflective layer 247 configured to reflect rays out-coupled from the curved light guide 210 (propagating in non-parallel directions) back to the curved light guide 210 as rays propagating in parallel directions. That is, the second reflective layer 247 may reflect non-parallel rays output from the curved light guide back to the curved light guide as parallel rays. In some embodiments, the second reflector 240 may include a second substrate 249 for supporting and protecting the second reflective layer 247. In some embodiments, the second substrate 249 may be omitted, and the second reflective layer 247 may have a sufficient rigidity, e.g., may be a free-standing layer.

When the second reflector 240 includes the second substrate 249, the second reflective layer 247 may be disposed at a surface of the second substrate 249 facing the curved light guide 210. The second substrate 249 may be similar to the first substrate 279. The second substrate 249 may be optically transparent in the operation wavelength of the system 200 (e.g., a visible wavelength range and/or an infrared wavelength range). The second substrate 249 may include a first surface (outer surface) 249-1 facing the real world environment, and a second surface (inner surface) 249-2 opposing the first surface 249-1 and facing the curved light guide 210. The second reflective layer 247 may be disposed at the second surface (inner surface) 249-2 of the second substrate 249.

The second reflective layer 247 may be a curved layer configured with a radius of curvature $R_5$. When the second reflector 240 includes the second substrate 249, the inner surface 249-2 of the second substrate 249 may also be configured with a radius of curvature $R_5$. In some embodiments, the radius of curvature $R_5$ of the second reflective layer 247 may be configured to be about two times the outer radius of curvature $R_1$ of the curved light guide 210, e.g., $R_5$ is about $2*R_1$. In some embodiments, the radius of curvature $R_5$ of the second reflective layer 247 may be configured to be substantially the same as the radius of curvature $R_3$ of the first reflective layer 277. In some embodiments, the radius of curvature $R_5$ of the second reflective layer 247 may be configured to be different from the radius of curvature $R_3$ of the first reflective layer 277.

In some embodiments, the first surface 249-1 of the second substrate 249 may be configured with a radius of curvature $R_4$. In some embodiments, the second substrate 249 may be configured with an optical power for vision correction, e.g., the radius of curvature $R_5$ of the second surface 249-2 and the radius of curvature $R_4$ of the first surface 249-1 may also be determined according to the user's prescription. That is, the second reflector 240 may function as a prescription lens with a reflection function. In some embodiments, the second reflector 240 may be a curved slab configured with the reflection function, but without an optical power (i.e., with a zero optical power).

In some embodiments, the total area of the second reflective layer 247 may be substantially the same as the total area of the output coupler 245. In some embodiments, the total area of the second reflective layer 247 may be greater than the total area of the output coupler 245. In some embodiments, as shown in FIG. 2A, the second reflective layer 247 and the output coupler 245 may be disposed at a same side of the curved light guide 210, such as the first surface 210-1. In some embodiments, the output coupler 245 may be in direct contact with the first surface 210-1. The output coupler 245 may have a curved shape, which may follow the same shape of the curved first surface 210-1. In some embodiments, the entire output coupler 245 may be in direct contact with the curved first surface 210-1. In some embodiments, substantially the entire output coupler 245 may follow the curved shape of the curved first surface 210-1. In some embodiments, the curved output coupler 245 may be in indirect contact with the curved first surface 210-1 through a thin layer of optically clear adhesive located therebetween.

The second reflective layer 247 may be disposed at a surface of the output coupler 245, being tangent to the surface of the output coupler 245. Thus, the output coupler 245 may be located between the second reflective layer 247 and the first surface 210-1 of the curved light guide 210. Due to the different radii of curvature between the second reflector layer 247 and the output coupler 245 (which has the same radius of curvature as the first surface 210-1), in some embodiments of the tangent configuration, only a small portion or area of the second reflective layer 247 may be in direct contact with the output coupler 245. In some embodiments, the small portion (or area) may be less than 5%, 4%, 3%, 2%, 1%, or 0.5% of the total area of the second reflective layer 247. The remaining major portions or areas of the second reflective layer 247 may be separated from the output coupler 245 by a space or gap.

In some embodiments, to increase bonding between the output coupler 245 and the second reflective layer 247, there may be a thin layer of optically clear adhesive located at the small portion or area between the output coupler 245 and the second reflective layer 247. In such embodiments, in the tangent configuration, only the small portion or area of the second reflective layer 247 may be in indirect contact with the output coupler 245 through the thin layer of optically clear adhesive, and the remaining major portions or areas of the second reflective layer 247 may be separated from the output coupler 245 by a space or gap. In some embodiments, to assist with bonding, a thin layer of optically clear adhesive may be present between the entire second reflective layer 247 and the output coupler 245. The refractive index of the optically clear adhesive may be smaller than the refractive index of the waveguide 210. That is, the optically clear adhesive may fill the space between the second reflective layer 247 and the output coupler 245.

In some embodiments, the output coupler 245 may be disposed at the second surface 210-2, and the second reflective layer 247 may be disposed at the first surface 210-1. That is, the output coupler 245 and the second reflective layer 247 may be disposed at opposite sides of the curved light guide 210. The second reflective layer 247 may be disposed tangent to the first surface 210-1. In some embodiments, the second reflective layer 247 may be in direct contact with the first surface 210-1 at only a small portion or area of the second reflective layer 247 due to the different radii of curvature between the second reflective layer 247 and the first surface 210-1. The remaining major portions or areas of the second reflective layer 247 may be separated from the first surface 210-1 by a space or gap. In some embodiments, to increase the bonding between the second reflective layer 247 and the first surface 210-1 of the light guide 210, there may be a thin layer of optically clear adhesive located at the small portion or area between the second reflective layer 247 and the first surfaces 210-1. In some embodiments, to assist with bonding, a thin layer of optically clear adhesive may be present between the entire second reflective layer 247 and the first surfaces 210-1. The refractive index of the optically clear adhesive may be smaller than the refractive index of the waveguide 210. That is, the optically clear adhesive may fill the space between the second reflective layer 247 and the first surfaces 210-1.

The first reflective layer 277 and the second reflective layer 247 may be configured with similar optical properties. For discussion purposes, when describing the optical properties of the first reflective layer 277 and the second reflective layer 247, the first reflective layer 277 and the second reflective layer 247 are collectively referred to as a reflective layer for convenience. In some embodiments, for an input light having a wavelength range within or overlapping with the operation wavelength of the system 200 (e.g., a visible wavelength range and/or an infrared wavelength range), the reflective layer may be configured to partially transmit the input light, and partially reflect the input light. In some embodiments, the reflective layer may be configured to maintain the polarization of the light reflected thereby. In some embodiments, the reflective layer may be configured to change the polarization of the light reflected thereby, e.g., changing the polarization of the light reflected thereby to an orthogonal polarization.

The reflective layer may be a polarization selective reflective layer, or a polarization non-selective layer. A polarization selective reflective layer may be configured to substantially reflect an input light having a first polarization (e.g., a circular polarization, or a linear polarization), and substantially transmit an input light having a second polarization (e.g., an orthogonal circular polarization, or an orthogonal linear polarization) different from (e.g., orthogonal to) the first polarization. Examples of the polarization selective reflective layer may include a linear reflective polarizer, a circular reflective polarizer (e.g., a cholesteric liquid crystal reflective polarizer), a reflective polarization volume hologram ("PVH") element, etc. In some embodiments, for an input light including two equal components of the first polarization and the second polarization, the polarization selective reflective layer may be configured to substantially reflect the component of the first polarization and substantially transmit the component of the second polarization. That is, the polarization selective reflective layer may reflect 50% and transmit 50% of the input light.

A polarization non-selective reflective layer may reflect an input light independent of the polarization of the input light. An example of the polarization non-selective reflective layer is a polarization non-selective partial reflective layer. The polarization non-selective partial reflective layer may partially reflect and partially transmit an input light, independent of the polarization of the input light. Examples of polarization non-selective partial reflective layer may include a volume Bragg grating ("VBG"), a 50:50 mirror (transmitting 50% and reflecting 50%, also referred to a polarization non-selective partial reflector), etc. For the polarization non-selective partial reflective layer, the percentages of the input light for the transmitted portion and the reflected portion may be any suitable percentages, such as 10%/90%, 20%/80%, 30%/70%, 40%/60%, 50%/50%, etc.

Each reflective layer may have an outer side facing the real world environment and an inner side facing the curved light guide 210. At the input portion of the curved light guide 210, the image light from the display element 220 may transmit through the curved light guide 210 and the in-coupler 235 (if the in-coupler 235 is disposed between the curved light guide 210 and the first reflective layer 277), and may be incident onto the first reflective layer 277 from the inner side of the first reflective layer 277. The in-coupled image light 231 propagating inside the curved light guide 210 through TIR may be out-coupled by the output coupler 245 toward the second reflective layer 247, and may be incident onto the second reflective layer 247 from the inner side of the second reflective layer 247. A light from a real world environment (e.g., a visible light, also referred to as a real world light) may be incident onto the first reflective layer 277 or the second reflective layer 247 from the outer side of the first reflective layer 277 or the second reflective layer 247. The second reflective layer 247 may transmit the real world light toward the eye-box region 259, such that the eye 260 may observe a see-through view optically combined with a virtual image generated by the display element 220.

The transmittance of the first reflective layer 277 for the real world light may be configured, depending on specific application.

In some embodiments, to increase the transmittance of a reflective layer for the real world light, in some embodiments, the reflective layer may be configured to be a narrowband reflective layer (or coating). In some embodiments, the reflection band of the reflective layer may substantially match with the emission band of the narrowband light source include in the display element 220. For example, the reflection band of the reflective layer may correspond to a primary color, such as blue, green, and red. In some embodiments, the reflection band may include blue, green, and red bands each having a bandwidth (FWHM) within a range of about 5 nm to 10 nm, a range of about 10 nm to 20 nm, a range of about 20 nm to 30 nm, or a range of about 30 nm to 40 nm, etc. For example, in some embodiments, when the display element 220 includes a micro-LED display panel, the bandwidth (FWHM) of each of the blue, green, and red reflection bands of the reflective layer may be configured to be about 20 nm. In some embodiments, when the display element 220 includes a laser scanning display panel, the bandwidth (FWHM) of each of the blue, green, and red reflection bands of the reflective layer may be configured to be about several nanometers, e.g., 5 nm.

Figure 2B:
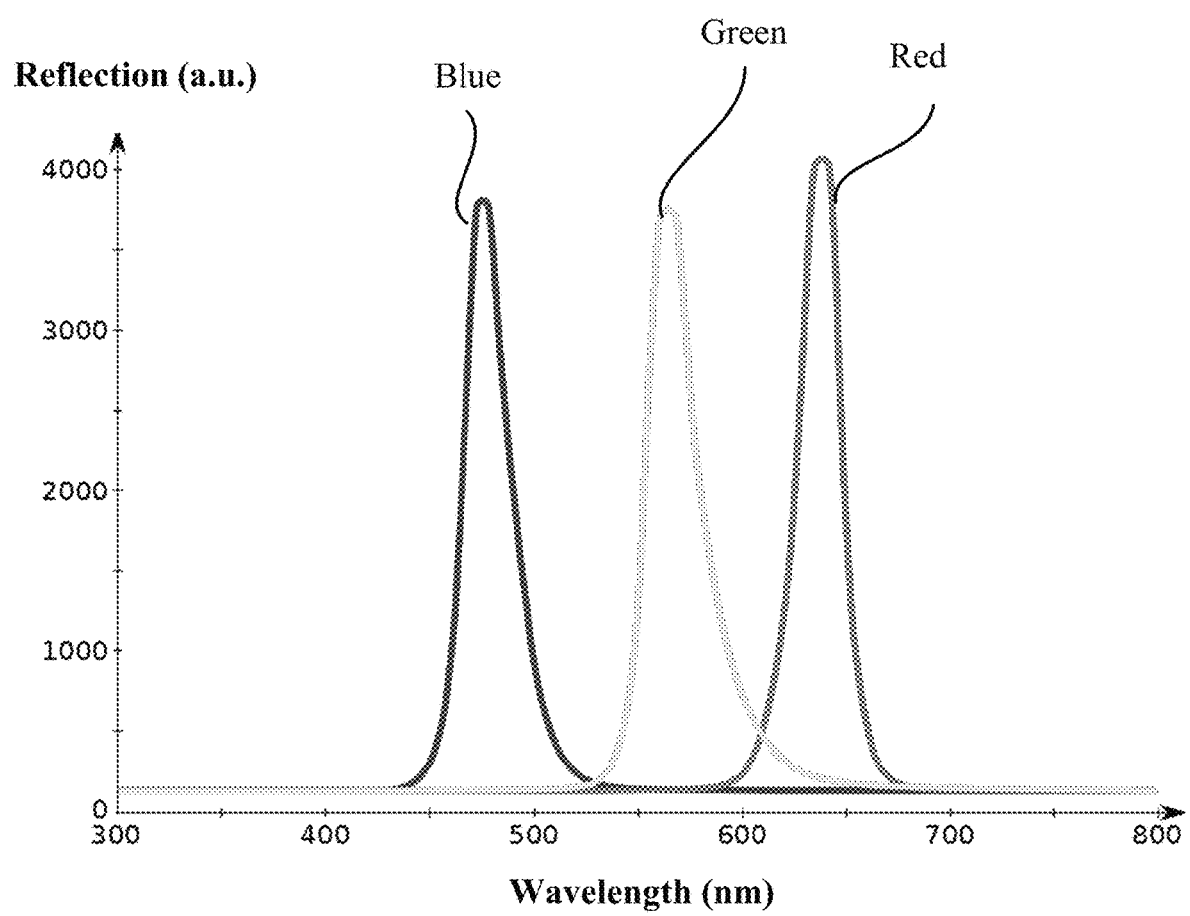
FIG. 2B illustrates a reflection spectrum of a reflector included in the curved light guide display assembly shown in FIG. 2A, according to an embodiment of the present disclosure.

FIG. 2B illustrates a reflection band of the reflective layer included in the curved light guide display assembly 200 shown in FIG. 2A, according to an embodiment of the present disclosure. As shown in FIG. 2B, the horizontal axis represents the wavelength (unit: nm), and the vertical axis represents the reflection (unit: arbitrary unit (a.u.)). The reflection band of the reflective layer (which may be the first reflective layer 277 or the second reflective layer 247) may include blue, green, and red reflection bands having a central wavelength of about 475 nm, 565 nm, and 630 nm, respectively. In some embodiments, the bandwidth (FWHM) of each of the blue, green, and red reflection bands may be within a range of about 23 nm-25 nm.

Referring back to FIG. 2A, to increase the transmittance of the reflective layer for the real world light, in some embodiments, the reflective layer may be configured with different reflectances for the lights incident thereonto from opposite sides of the reflective layer. For example, the reflective layer may be configured to function as an isolator that substantially reflects a light incident onto the reflective layer from the inner side of the reflective layer, and substantially transmits a light incident onto the reflective layer from the outer side of the reflective layer. Thus, the real world light incident onto the reflective layer from the outer side of the reflective layer may be substantially transmitted through the reflective layer, while the image light incident onto the reflective layer from the inner side of the reflective layer may be substantially reflected by the reflective layer.

The optical path of a bundle of parallel rays in the image light 229 from the display panel 220 to the eye-box region 259 via the curved light guide image combiner 280 will be explained with reference to FIGS. 2A, 2C, and 2D. For illustrative and discussion purposes, in the embodiment shown in FIG. 2A, each of the input coupler 235 and the output coupler 245 may be configured to include a polarization selective diffraction grating that may be circular or linear polarization selective. The input coupler 235 and the output coupler 245 may also be referred to as the in-coupling grating 235 and the out-coupling grating 245, respectively. In the embodiment shown in FIG. 2A, each of the in-coupling grating 235 and the out-coupling grating 245 may be a transmissive grating that is configured to substantially forwardly diffract a light when the Bragg condition is substantially satisfied. Each of the in-coupling grating 235 and the out-coupling grating 245 may be a uniform grating that diffracts rays incident onto respective portions of the grating with the same incidence angle by the same diffraction angle. The incidence angle is an angle formed between the ray and the local normal of the surface of the grating. In some embodiments, the uniform grating may have a uniform grating period, a uniform slant angle, a uniform duty cycle, a uniform thickness, and/or a uniform refractive index, etc.

For discussion purposes, in the embodiment shown in FIG. 2A, the image light 230 output from the light source assembly 205 may be a polarized light having a first polarization. For discussion purposes, each of the in-coupling grating 235 and the out-coupling grating 245 is configured as a polarization selective grating that transmits a polarized light having the first polarization (e.g., a right-handed circular polarization) with negligible diffraction, and forwardly diffracts a polarized light having a second polarization (e.g., a left-handed circular polarization) that is orthogonal to the first polarization. For discussion purposes, each of the in-coupling grating 235 and the out-coupling grating 245 is configured to maintain the polarization of a polarized light that is diffracted thereby or transmitted therethrough.

For discussion purposes, in the embodiment shown in FIG. 2A, each of the first reflective layer 277 and the second reflective layer 247 may be a polarization selective reflective layer configured to substantially reflect a polarized light having the first polarization, and substantially transmit a polarized light having the second polarization with negligible or zero reflection. For discussion purposes, in the embodiment shown in FIG. 2A, each of the first reflective layer 277 and the second reflective layer 247 may be configured to change a polarization of a polarized light reflected thereby, e.g., reflecting the polarized light having the first polarization as a polarized light having the second polarization.

Figure 2C:
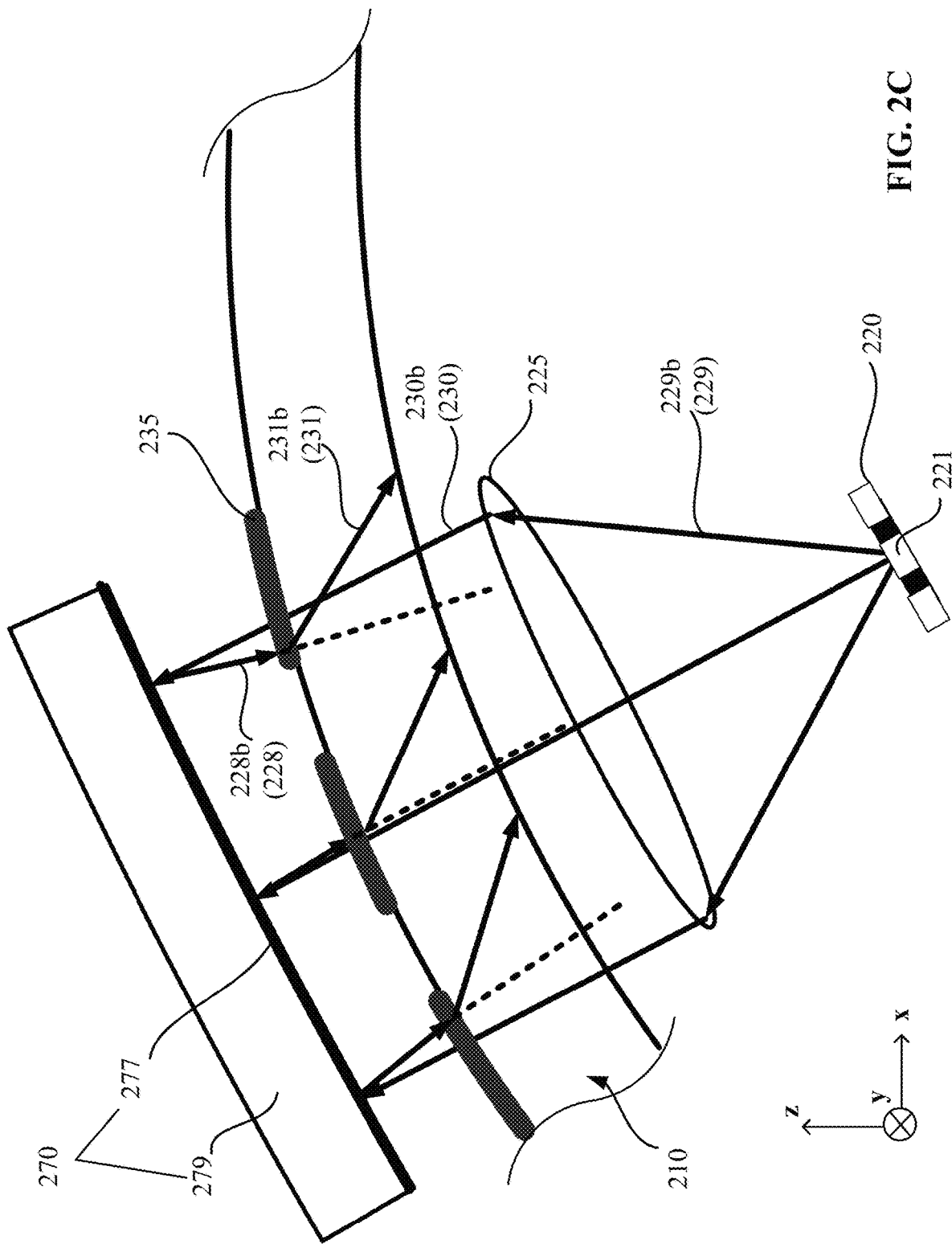
FIG. 2C illustrates an enlarged view of an input portion of a curved light guide image combiner included in the curved light guide display assembly shown in FIG. 2A, according to an embodiment of the present discourse.

FIG. 2C illustrates an enlarged view of an input portion of the curved light guide image combiner 280 shown in FIG. 2A, according to an embodiment of the present discourse. For illustrative purposes, in FIG. 2C, the first reflective layer 277 is shown as spaced apart from the in-coupling grating 235 such that the light paths between them can be clearly illustrated. It is understood that the first reflective layer 277 is curved and the in-coupling grating 235 is also curved. The radii of curvature of the first reflective layer 277 and the in-coupling grating 235 are different, and the first reflective layer 277 is disposed tangent to the in-coupling grating 235. It is understood that dashed lines are used to show the in-coupling grating 235, which does not necessarily mean that the in-coupling grating 235 is segmented. Rather, in some embodiments, the in-coupling grating 235 may be a contiguous, curved piece.

As shown in FIG. 2C, a bundle of (e.g., three) divergent rays (of the image light 229) may be output from the central pixel 221 of the display element 220 toward the collimating lens 225. The collimating lens 225 may convert the bundle of (e.g., three) divergent rays 229b (of the image light 229) into a bundle of (e.g., three) parallel rays 230b (of the image light 230), representing a single FOV direction of the input FOV, e.g., the zero-degree FOV direction of the input FOV. Other rays emitted from other pixels are not shown in FIG. 2C. The same processes described herein for the bundle of divergent rays 229b output from the central pixel 221 apply to the respective bundles of divergent rays emitted from the respective pixels. For example, the collimating lens 225 may convert the respective bundle of divergent rays (of the image light 229) emitted from the respective pixels into respective bundle of parallel rays (of the image light 230), representing respective FOV directions of the input FOV.

As the in-coupling grating 235 is configured to transmit a polarized light having the first polarization, and diffract a polarized light having the second polarization, the parallel rays 230b of the image light 230 having the first polarization may be transmitted through the in-coupling grating 235 toward the first reflective layer 277. The first reflective layer 277 may reflect the image light 230 having the first polarization as an image light 228 having the second polarization toward the in-coupling grating 235. The first reflective layer 277 may reflect the bundle of (e.g., three) parallel rays 230b of the image light 230 as a bundle of (e.g., three) convergent rays 228b of the image light 228 back to the in-coupling grating 235. The respective convergent rays 228b of the image light 228 that are incident onto respective portions of the curved in-coupling grating 235 may form the same incidence angle at the respective portions of the in-coupling grating 235. The incidence angle is an angle between the ray and the local surface normal of the surface of the in-coupling grating 235, or the first surface of the curved light guide 210.

For discussion purposes, FIG. 2C shows that the respective convergent rays 228b of the image light 228 are incident onto respective portions of the in-coupling grating 235 with a normal incidence angle. That is, the respective propagation directions of the respective convergent rays 228b of the image light 228 that are incident onto respective portions of the in-coupling grating 235 are substantially parallel with the respective local normals of the surface of in-coupling grating 235 (or the first surface 210-1 of the curved light guide 210).

The in-coupling grating 235 may couple the image light 228 having the second polarization into the curved light guide 210 as the in-coupled image light 231 having the second polarization. The in-coupled image light 231 may also be referred to as TIR propagating image light 231. For discussion purposes, the polarization of the in-coupled image light 231 may be substantially maintained while propagating inside the curved light guide 210. Thus, the in-coupled image light 231 incident onto different portions of the out-coupling grating 245 may be a polarized light having the second polarization.

For example, the in-coupling grating 235 may couple the bundle of (e.g., three) convergent rays 228b of the image light 228 into the curved light guide 210 as the bundle of (e.g., three) parallel rays 231b of the in-coupled image light 231. The bundle of (e.g., three) rays 231b may have the same TIR propagation angle inside the curved light guide 210 when prorogating toward the out-coupling grating 245 via TIR. That is, with the first reflective layer 277, the bundle of parallel rays 230b of the image light 230 may be reflected by the first reflective layer 277 as the bundle of convergent rays 228b of the image light 228 that are incident onto various portions of the in-coupling grating 235 with the same incidence angle. As a result, the curved in-coupling grating 235 may couple the bundle of convergent rays 228b into the curved light guide 210 as the bundle of parallel rays 231b having the same TIR propagation angle. Without the first reflective layer 277, in a conventional system, the bundle of parallel rays 230b may be coupled into the curved light guide 210 as a bundle of non-parallel rays having different TIR propagation angles.

Figure 2D:
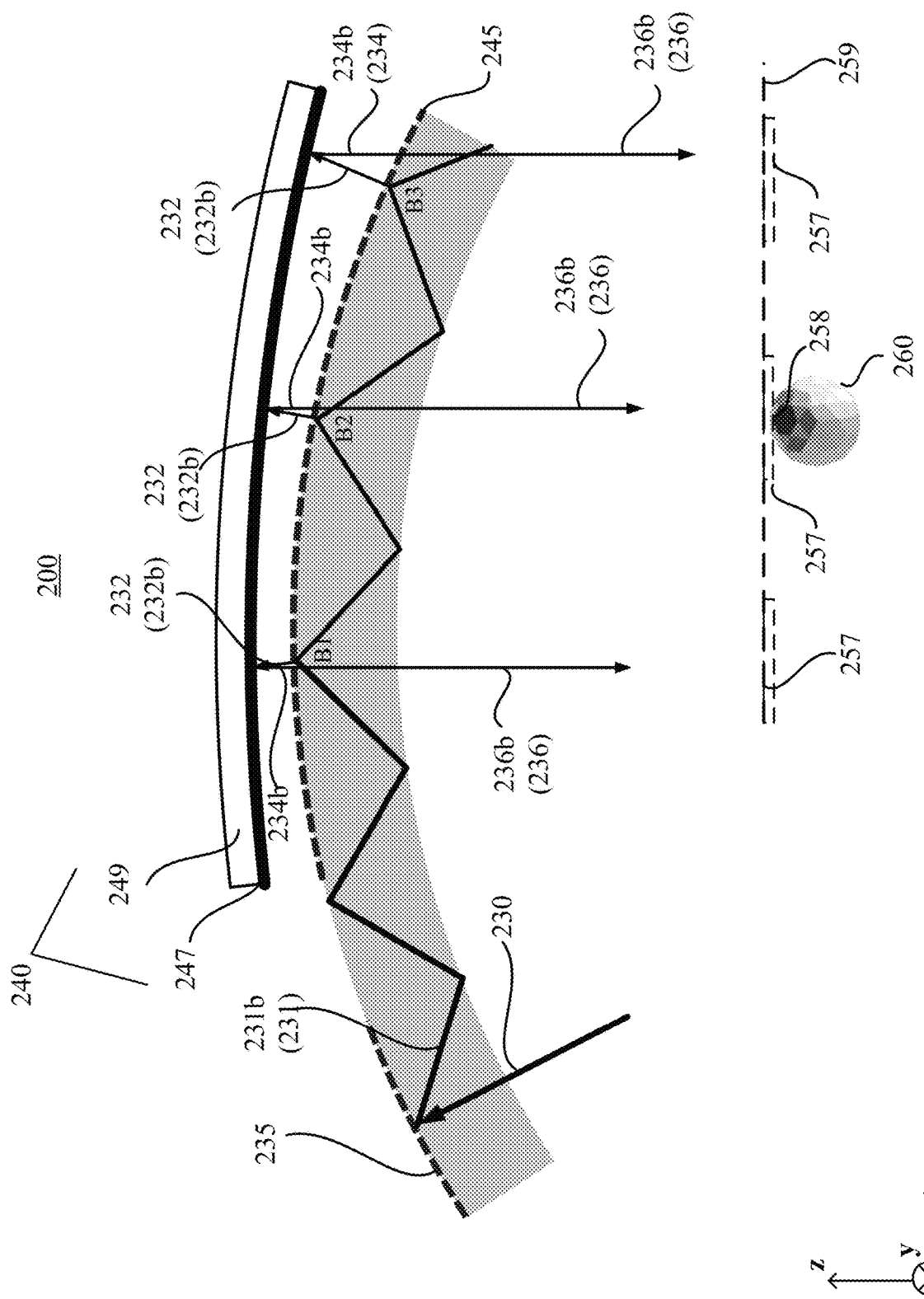
FIG. 2D illustrates an enlarged view of an output portion of the curved light guide image combiner shown in FIG. 2A, according to an embodiment of the present discourse.

FIG. 2D illustrates an enlarged view of an output portion of the curved light guide image combiner 280 shown in FIG. 2A, according to an embodiment of the present discourse.

For a clear illustration of the optical path of the image light between the second reflector 240 and the out-coupling grating 245, in FIG. 2D, the second reflective layer 247 is shown as spaced apart from the out-coupling grating 245. It is understood that the second reflective layer 247 is curved, the out-coupling grating 245 is curved, and the radii of curvature of the second reflective layer 247 and the out-coupling grating 245 are different, such that the second reflective layer 247 is disposed tangent to the out-coupling grating 245. It is understood that dashed lines are used to show the out-coupling grating 245, which does not necessarily mean that the out-coupling grating 245 is segmented. Rather, in some embodiments, the out-coupling grating 245 may be a contiguous, curved piece.

As shown in FIG. 2D, when the in-coupled image light 231 is incident onto different portions (e.g., B1, B2, and B3) of the out-coupling grating 245, the out-coupling grating 245 may couple, via forward diffraction, the in-coupled image light 231 (i.e., the TIR propagating image light) as a plurality of output image lights 232 out of the curved light guide 210 toward the second reflective layer 247, rather than directly toward the eye-box region 259. Each image light 232 may have an output FOV that may be substantially the same as the input FOV (e.g., a) of the input image light 230. For discussion purposes, FIG. 2D shows three output image lights 232, and shows a single ray (e.g., central ray) 232b of each output image light 232.

For example, the out-coupling grating 245 may diffract the central ray 231b of the in-coupled image light 231 incident onto different portions (e.g., B1, B2, and B3) of the out-coupling grating 245 by the same diffraction angle. The diffraction angle is an angle formed by the central ray 232b of the output image light 232 and the local normal of the surface of the out-coupling grating 245 or the first surface 210-1 of the curved light guide 210. That is, the three output rays (e.g., central rays) 232b of the respective output image lights 232 may form the same angle with the respective local normals of the out-coupling grating 245 (or the first surface 210-1 of the curved light guide 210). For example, as shown in FIG. 2D, the three rays (e.g., central rays) 232b of the respective output image lights 232 may be normally output from the out-coupling grating 245, with the respective propagation directions being parallel with the respective local normals of the out-coupling grating 245 (or the first surface 210-1 of the curved light guide 210). In other words, the diffraction angle of the three output rays (e.g., central rays) 232b of the respective output image lights 232 may be zero. The three rays (e.g., central rays) 232b of the respective output image lights 232 may propagate in non-parallel directions (e.g., divergently) toward the second reflective layer 247.

The output image lights 232 may be polarized lights having the second polarization. The second reflective layer 247 may be configured to substantially reflect the output image lights 232 having the second polarization back toward the output coupler 245 and the curved light guide 210 as a plurality of image lights 234 having the first polarization. That is, the second reflective layer 247 may change the polarization of the output image lights 232 when the output image lights 232 are reflected. The second reflective layer 247 may be configured to substantially reflect the three rays (e.g., central rays) 232b that propagate in non-parallel directions toward the second reflective layer 247 as three rays (e.g., central rays) 234b that propagate in parallel directions toward the curved light guide 210. For example, FIG. 2D shows that the three rays (e.g., central rays) 234b propagate in parallel directions toward the curved light guide 210 along the z-axis direction. The three rays (e.g., central rays) 234b may represent the zero-degree FOV direction of the output FOV. That is, the curved light guide image combiner 280 may replicate the central ray 230b of the input image light 230 (representing the zero-degree FOV direction of the input FOV) as the three central rays 234b of the three image light 234 (representing the zero-degree FOV direction of the output FOV).

As the out-coupling grating 245 may be configured to diffract a polarized light having the second polarization, and transmit a polarized light having the first polarization, the out-coupling grating 245 may transmit, with negligible or zero diffraction, the image lights 234 having the first polarization as a plurality of image lights 236 while maintaining the propagation directions. The image lights 236 may transmit through the curved light guide 210 toward the eye-box region 259 without changing the propagation directions. Thus, three rays (e.g., central rays) 236b of the respective image lights 236 may propagate in parallel directions toward the eye-box region 259. The angular deviation of the propagation direction of the central ray 236b of the image light 236 with respect to the zero degree FOV direction may be substantially zero. That is, the propagation direction of the central ray 236b of the image light 236 may be the same as the zero degree FOV direction.

Without the second reflective layer 247, in a conventional system, such as the one shown in FIG. 1E, the curved out-coupling grating 195 may directly couple the in-coupled ray 181b out of the curved light guide 170 as a plurality of output rays 182b having non-parallel propagation directions toward the eye-box region 159, causing image formation errors and degrading image quality at the eye-box region 159. In the embodiments of the present disclosure, by configuring the second reflective layer 247, the three output rays 234b propagating in non-parallel directions toward the second reflective layer 247 may be reflected and converted into the three rays 236b that propagate in parallel directions toward the eye-box region 259, thereby reducing or eliminating the image formation errors and enhancing the image quality at the eye-box region 259.

The plurality of image lights 236 may propagate through a plurality of exit pupils 257 positioned in the eye-box region 259 of the system 200. For example, the size of a single exit pupil 257 may be larger than and comparable with the size of the eye pupil 258. The exit pupils 257 may be sufficiently spaced apart, such that when one of the exit pupils 257 substantially coincides with the position of the eye pupil 258, the remaining one or more exit pupils 257 may be located beyond the position of the eye pupil 258 (e.g., falling outside of the eye 260). Thus, the curved light guide image combiner 280 including the curved light guide 210, the in-coupling grating 235, the out-coupling grating 245, the first reflective layer 277, and the second reflective layer 247 may replicate each bundle of parallel rays of the input image light 230 as multiple bundles of output rays 236. The multiple bundles of output rays 236 may propagate in parallel directions toward the eye-box region 259, thereby expanding an effective pupil of the system 200.

Referring back to FIG. 2A, the second reflective layer 247 may also receive the real world light 242. In some embodiments, the real world light 242 may be an unpolarized light. In some embodiments, the second reflective layer 247 may partially transmit the real world light 242 as a real world light 244 propagating toward the eye-box region 259, and partially reflect the real world light 242 (not shown). In some embodiments, the second reflective layer 247 may function as an isolator to substantially transmit the real world light 242 as the real world light 244 propagating toward the eye-box region 259. Thus, the curved light guide image combiner 280 may combine the real world light 242 with the image light 236 and deliver the combined light to the exit pupil 257. As a result, the eye 260 may observe the virtual scene optically combined with the real world scene.

In a conventional curved light image combiner shown in FIG. 1E, the three output rays 182b propagate in non-parallel directions (e.g., convergently) toward the eye-box region 159, causing the image formation errors at the exit pupils 157. In the disclosed curved light guide image combiner 280 shown in FIG. 2A, the three output rays 232b may be out-coupled from the curved light guide 210 at different portions of the out-coupling grating 245 toward the second reflective layer 247 located at an outer side of the curved light guide 210 that is opposite to an inner side where the eye-box region 259 is located. The second reflective layer 247 may reflect the three output rays 232b having non-parallel propagation directions as the three rays 234b having parallel propagation directions. Thus, the three rays 234b may propagate in parallel directions (e.g., along a −z axis direction shown in FIG. 2A) toward the eye-box region 259. As a result, the image formation errors at the exit pupils 257 may be reduced, and the image quality of the system 200 may be improved.

Although not shown, in some embodiments, the second reflective layer 247 may be a polarization non-selective partial reflective layer. For example, the second reflective layer 247 may partially reflect the respective output image lights 232 as the respective image lights 234 back to the curved light guide 210, and partially transmit the respective output image light 232 as respective image lights (the transmitted portions are not shown for the simplicity of illustration) propagating toward the real world environment. The three rays (e.g., central rays) of the respective image lights propagating toward the real world environment may have non-parallel (e.g., divergent) propagation directions. In some embodiments, the second reflective layer 247 may be a polarization non-selective reflective layer configured to substantially reflect an input light regardless of the polarization of the input light.

For discussion purposes, in the embodiment shown in FIG. 2A, both of the radius of curvature $R_3$ of the first reflective layer 277 and the radius of curvature $R_5$ of the second reflective layer 247 are configured to be about two times the outer radius of curvature $R_1$ of the curved light guide 210, e.g., $R_5=R_3=2*R_1$. The image plane of the display element 220 generated by the curved light image combiner 280 may be located at an infinite depth (or distance) with respect to the eye pupil 258 positioned at the eye-box region 259. In some embodiments, both of the radius of curvature $R_3$ of the first reflective layer 277 and the radius of curvature $R_5$ of the second reflective layer 247 may be configured to be greater than two times of the outer radius of curvature $R_1$ of the curved light guide 210, e.g., $R_5=R_3>2*R_1$. Thus, the image plane of the display element 220 generated by the curved light image combiner 280 may be located at a finite depth (or distance) with respect to the eye pupil 258 positioned at the eye-box region 259.

In some embodiments, at least one (e.g., each) of the radius of curvature $R_3$ of the first reflective layer 277 or the radius of curvature $R_5$ of the second reflective layer 247 may be configured to be fixed. In some embodiments, at least one (e.g., each) of the radius of curvature $R_3$ of the first reflective layer 277 or the radius of curvature $R_5$ of the second reflective layer 247 may be configured to be adjustable. For example, each of the radius of curvature $R_3$ of the first reflective layer 277 or the radius of curvature $R_5$ of the second reflective layer 247 may be adjustable within a range from $2*R_1$ to $3*R_1$, $4*R_1$, or $5*R_1$, etc. Thus, the distance of the image plane of the display element 220 generated by the curved light image combiner 280 with respect to the eye-box region 259 may be adjustable, for addressing the vergence accommodation conflict. Accordingly, the user experience of the system 200 may be improved.

For example, in some embodiments, the second reflector 240 (or the first reflector 270) may include a piezo-membrane that is optically transparent and is deformable by, e.g., applying a voltage, and the second reflective layer 247 (or the first reflective layer 277) may be disposed at the piezo-membrane. The piezo-membrane may be the respective substrate, or may be an additional layer included in the reflector. In some embodiments, the second reflector 240 (or the first reflector 270) may include a membrane liquid lens in which an optical fluid is encapsulated by a substrate and a deformable member. The deformable member may be deformable via a suitable actuator. The second reflective layer 247 (or the first reflective layer 277) may be disposed at the deformable membrane. The membrane liquid lens may replace the substrate 279 (or 249) in the reflector.

Figure 2E:
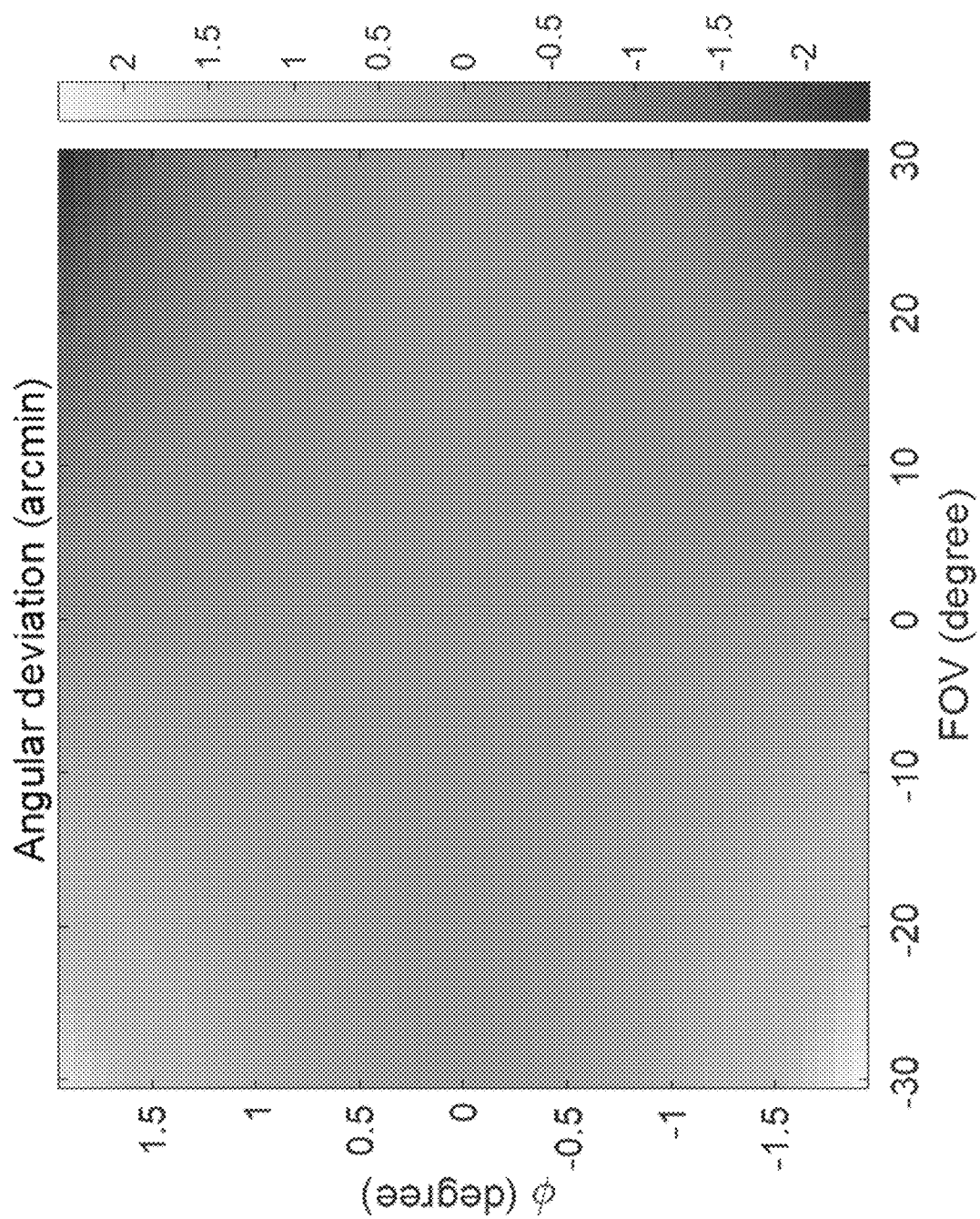
FIG. 2E illustrates simulation results showing angular deviations of image lights output from the curved light guide image combiner shown in FIG. 2A, according to an embodiment of the present disclosure.
Figure 2F:
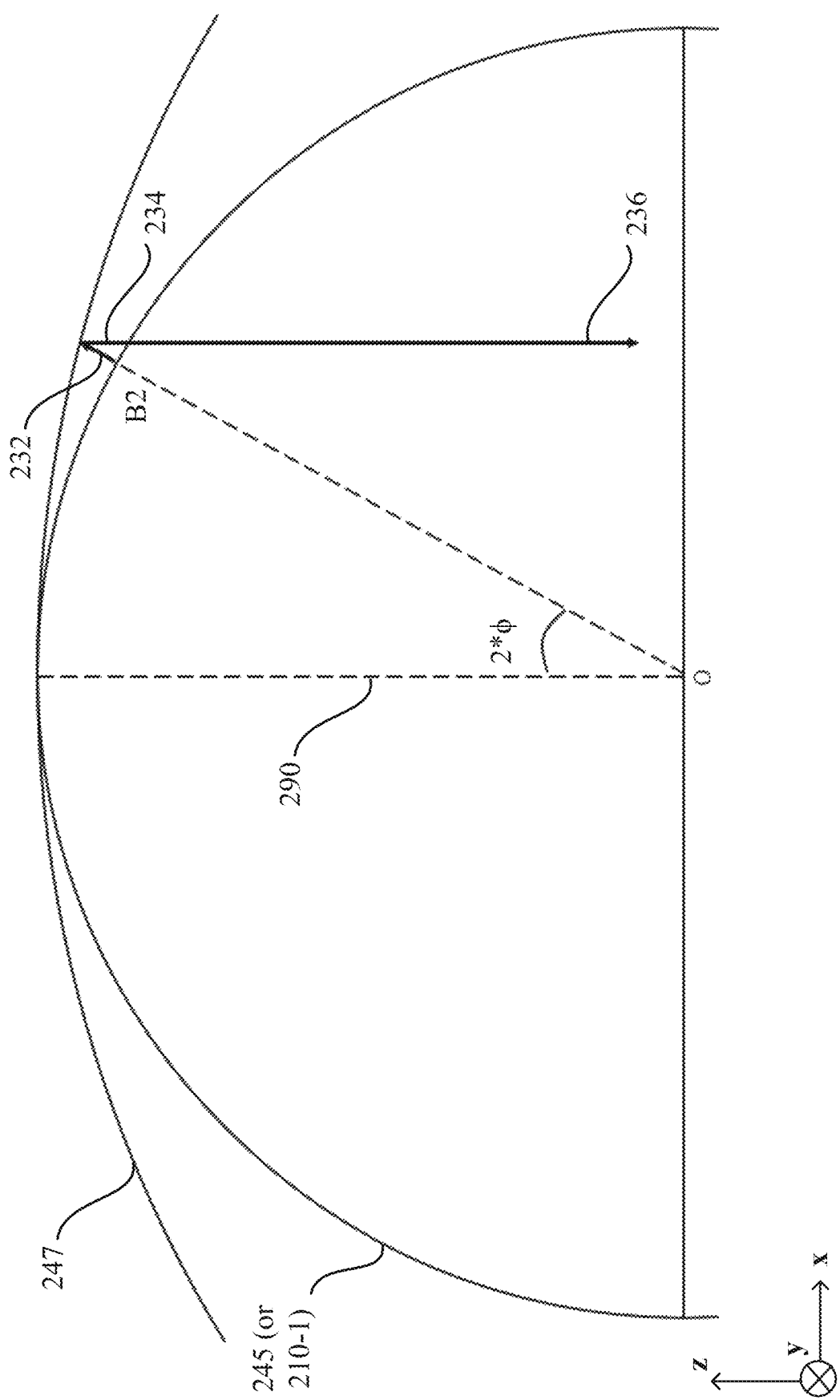
FIG. 2F illustrates an enlarged view of the output portion of the curved light guide image combiner for calculating the angular deviations of image lights output from the curved light guide image combiner shown in FIG. 2A, according to an embodiment of the present discourse.

FIG. 2E illustrates simulation results showing angular deviations of rays of the image lights 236 output from the curved light guide image combiner 280 shown in FIG. 2A with respect to the designed output FOV direction, according to an embodiment of the present disclosure. FIG. 2F illustrates an enlarged view of the output portion of the curved light guide image combiner 280 for calculating the angular deviations of the rays of the image lights 236 output from the curved light guide image combiner 280, according to an embodiment of the present discourse. As shown in FIG. 2F, the angular deviations of rays of the image lights 236 with respect to the designed output FOV direction may be the same as the angular deviations of the rays of the image lights 234 with respect to the designed output FOV direction. For discussion purposes, FIG. 2F shows the ray of the output image light 232 that is out-coupled from the light guide 210 at the portion B2, the ray of the output image light 232 is reflected by the second reflective layer 247 as the ray of the image light 234, and the ray of the image light 234 is transmitted through the out-coupling grating 245 and the light guide 210 as the ray of the image light 236.

In FIG. 2F, a radius direction passing through the center O of the circle that approximately fits the out-coupling grating 245 or the first surface 210-1 may be referred to as a primary direction 290. A radius direction passing through the center O of the circle that approximately fits the out-coupling grating 245 or the first surface 210-1 and the incidence point of the in-coupled image light 231 onto the out-coupling grating 245 (e.g., B2 in FIG. 2F) may form an angle of $2*\phi$ (unit: degree) with respect to the primary direction 290. The angle of $2*\phi$ (unit: degree) may reflect a position of an incidence point of the ray of the output image light 232 onto the second reflective layer 247.

Referring to FIG. 2E, the horizontal axis represents the designed output FOV direction (unit: degree), and the vertical axis represents the angle $\phi$ that is related to the position of an incidence point of the ray of the output image light 232 onto the second reflective layer 247. The grey scale bar represents the angular deviation (unit: arcmin) of the propagation direction of the ray of the image light 236 (or the image light 234) with respect to the designed output FOV direction. In the simulation, the radius of curvature $R_1$ of the first surface 210-1 of the curved light guide 210 is 150 mm, and the radius of curvature $R_3$ of the first reflective layer 277 and the radius of curvature $R_5$ of the second reflective layer 247 is 300 nm. The size of the out-coupling grating 245 may match with the size of the eye-box region 259, e.g., the eye-box region 259 and the out-coupling grating 245 may have a same size of 20 mm. The size (or area) of the first reflective layer 277 may be the same as or larger than the size (or area) of the in-coupling grating 235, and the size (or area) of the second reflective layer 247 may be the same as or larger than the size (or area) of the out-coupling grating 245. The angle $\phi$ is calculated to change from $-1.91°$ to $+1.91°$.

As shown in FIG. 2E, for a given designed output FOV direction within the range of $-30°$ to $+30°$, the angular deviation may gradually increase as the absolute value of the angle $\phi$ increases. For a given absolute value of the angle $\phi$, the absolute value of the angular deviation may gradually increase as the designed output FOV direction gradually increases from the zero degree. When the absolute value of the angle $\phi$ is less than or equal to $1.0°$, the absolute value of the angular deviation is less than 1 arcmin for the designed output FOV direction within the range of $-30°$ to $+30°$. When the absolute value of the angle $\phi$ is greater than $1.0°$, the absolute value of the angular deviation is within the range of 1 arcmin to 2 arcmin for the designed output FOV direction within the range of $-30°$ to $+30°$. For an eye pupil with a size of 3 mm, the angle $\phi$ is calculated to change from $-0.6°$ to $+0.6°$. FIG. 2E shows the absolute value of the angular deviation is less than 0.5 arcmin for the designed output FOV direction within the range of $-30°$ to $+30°$.

Figure 3:
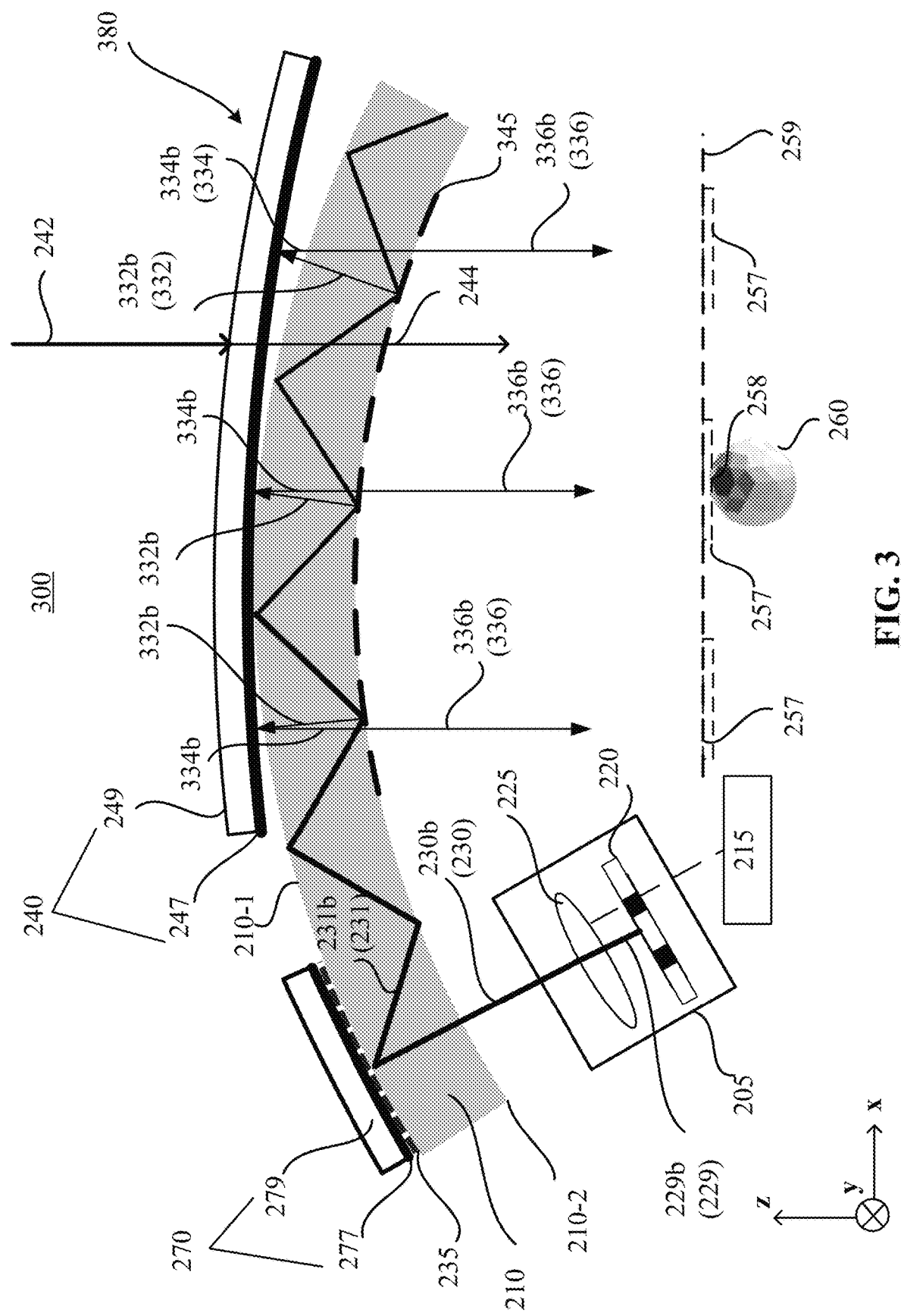
FIG. 3 schematically illustrates a diagram of a curved light guide display assembly, according to an embodiment of the present disclosure.

FIG. 3 illustrates a schematic diagram of a curved light guide display system or assembly 300, according to an embodiment of the present disclosure. The curved light guide display system 300 may include elements that are similar to or the same as those included in the curved light guide display system 200 shown in FIGS. 2A-2D. Descriptions of the same or similar elements or features can refer to the above corresponding descriptions, including those rendered in connection with FIGS. 2A-2D.

As shown in FIG. 3, the curved light guide display system 300 may include the light source assembly 205, the controller 215, and a curved light guide image combiner 380. The curved light guide image combiner 380 may include the curved light guide 210, the input coupler (e.g., the in-coupling grating) 235, an output coupler (e.g., an out-coupling grating) 345, the first reflector 270, and the second reflector 240. The output coupler 345 may be similar to the output coupler 245 shown in FIG. 2A. In the embodiment shown in FIG. 3, the output coupler 345 (shown in dashed lines) and the second reflector 240 may be disposed at opposite surfaces of the curved light guide 210, e.g., at the second surface 210-2 and the first surface 210-1, respectively. In the embodiment shown in FIG. 3, the in-coupling grating 235 may be a transmissive grating, and the out-coupling grating 245 may be a reflective grating. In some embodiments, although not shown, the in-coupling grating 235 and the first reflector 270 may also be disposed at opposite surfaces of the curved light guide 210, and the in-coupling grating 235 may be a reflective grating. A reflective grating may be configured to substantially backwardly diffract a light when the Bragg condition is substantially satisfied.

In the embodiment shown in FIG. 3, each of the in-coupling grating 235 and the out-coupling grating 345 may be a uniform grating. For discussion purposes, each of the in-coupling grating 235 and the out-coupling grating 345 may be configured to be a polarization selective grating that transmits a polarized light having a first polarization, and diffracts a polarized light having a second polarization that is orthogonal to the first polarization. For discussion purposes, each of the in-coupling grating 235 and the out-coupling grating 345 may be configured to maintain the polarization of a polarized light that is diffracted thereby or transmitted therethrough.

For discussion purposes, in the embodiment shown in FIG. 3, the image light 230 (that is an input light of the curved light guide image combiner 380) output from the light source assembly 205 may be a polarized light having the first polarization (e.g., right-handed circular polarization). Coupling of the image light 230 into the curved light guide 210 may refer to the description in connection with FIG. 2C. The in-coupled image light 231 may be a polarized light having the second polarization (e.g., left-handed circular polarization). When the in-coupled image light 231 is incident onto different portions of the out-coupling grating 345, the out-coupling grating 345 may couple, via backward diffraction, the in-coupled image light 231 as a plurality of output image lights 332 propagating toward the second reflector 240. Each image light 332 may have an output FOV that may be substantially the same as the input FOV (e.g., a) of the input image light 230.

For discussion purposes, FIG. 3 shows three output image lights 332, and shows a single ray (e.g., central ray) 332b of each output image light 332. The three rays (e.g., central rays) 332b of the respective output image lights 332 may form the same angle with the respective local normals of the out-coupling grating 345 (or the second surface 210-2 of the curved light guide 210). That is, the three rays 332b of the respective output image lights 332 may have the same diffraction angle. For example, as shown in FIG. 3, the three rays 332b of the respective output image lights 332 may be normally output from the out-coupling grating 345, with the respective propagation directions parallel with the respective local normals the out-coupling grating 345 (or the second surface 210-2 of the curved light guide 210). In other words, the diffraction angle the three rays 332b of the respective output image lights 332 may be zero. The three rays 332b of the respective output image lights 332 may propagate in non-parallel directions (e.g., divergently) toward the second reflector 240.

The output image lights 332 may be polarized lights having the second polarization. The second reflective layer 247 may be configured to substantially reflect the output image lights 332 having the second polarization back to the curved light guide 210 as a plurality of image lights 334 having the first polarization. The second reflective layer 247 may be configured to substantially reflect the three rays 332b of the respective output image lights 332 that propagate in non-parallel directions (e.g., divergently) as three rays (e.g., central rays) 334b of the respective image lights 334 that propagate in parallel directions toward the curved light guide 210.

The image lights 334 having the first polarization may transmit through the curved light guide 210 toward the out-coupling grating 345. As the out-coupling grating 345 is configured to diffract a polarized light having the second polarization, and transmit a polarized light having the first polarization, the out-coupling grating 345 may transmit the image lights 334 having the first polarization as a plurality of image lights 336 having the first polarization while maintaining the propagation directions. Thus, the curved light guide image combiner 380 including the in-coupling grating 235, the curved light guide 210, the out-coupling grating 345, the first reflector 270, and the second reflector 240 may replicate the input image light 230 as multiple output image lights 336, thereby expanding an effective pupil of the system 300. For example, the out-coupling grating 345 may transmit the three rays (e.g., central rays) 334b as three rays (e.g., central rays) 336b propagating toward the eye-box region 259 in parallel directions.

The second reflector 240 may also receive the real world light 242. In some embodiments, the real world light 242 may be an unpolarized light. In some embodiments, the second reflective layer 247 may partially transmit the real world light 242 as a real world light 244 propagating toward the eye-box region 259, and partially reflect the real world light 242 (not shown) back to the real world environment. In some embodiments, the second reflective layer 247 may function as an isolator to substantially transmit the real world light 242 as the real world light 244 propagating toward the eye-box region 259. Thus, the curved light guide image combiner 380 may combine the real world light 242 with the image light 336 and deliver the combined light to the exit pupil 257. As a result, the eye 260 may observe the virtual scene optically combined with the real world scene.

Although not shown, in some embodiments, the second reflective layer 247 may be a polarization non-selective partial reflective layer. That is, the second reflective layer 247 may partially reflect the respective output image lights 332 as the respective image lights 334 back to the curved light guide 210, and partially transmit the respective output image light 332 as respective image lights (not shown) propagating toward the real world environment. The three rays (e.g., central rays) of the respective image lights propagating toward the real world environment may have non-parallel (e.g., divergent) propagation directions.

Figure 4:
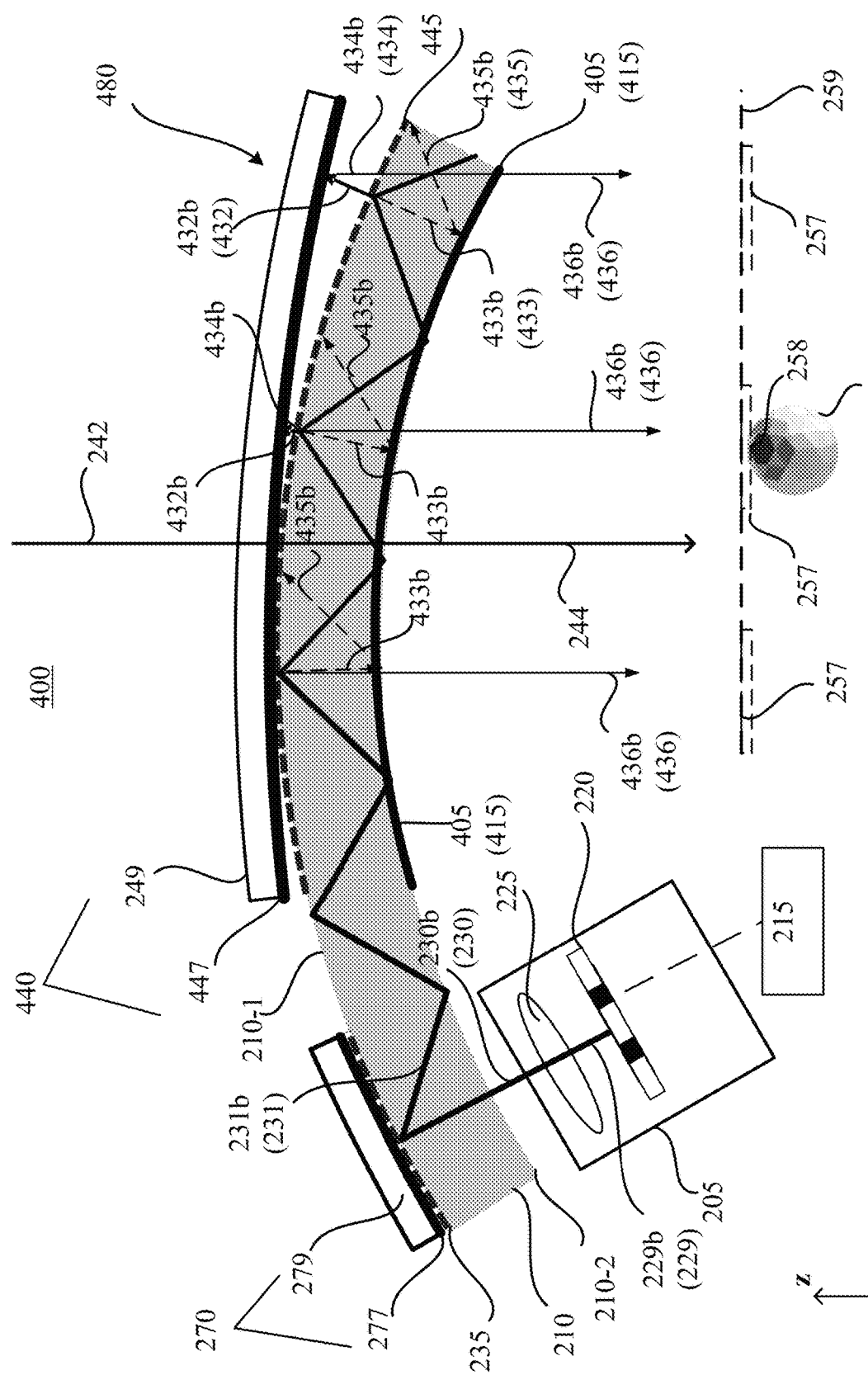
FIG. 4 schematically illustrates a diagram of a curved light guide display assembly, according to an embodiment of the present disclosure.

FIG. 4 illustrates a schematic diagram of a curved light guide display system or assembly 400, according to an embodiment of the present disclosure. The curved light guide display system 400 may include elements that are similar to or the same as those included in the curved light guide display system 200 shown in FIGS. 2A-2D, or the curved light guide display system 300 shown in FIG. 3. Descriptions of the same or similar elements or features can refer to the above corresponding descriptions, including those rendered in connection with FIGS. 2A-2D or FIG. 3.

As shown in FIG. 4, the curved light guide display system 400 may include the light source assembly 205, the controller 215, and a curved light guide image combiner 480. The curved light guide image combiner 480 may include the curved light guide 210, the input coupler (e.g., the in-coupling grating) 235, an output coupler (e.g., an out-coupling grating) 445, the first reflector 270, a second reflector 440, and a third reflector 405. The output coupler 445 may be similar to the output coupler 245 shown in FIG. 2A. In the embodiment shown in FIG. 4, each of the in-coupling grating 235 and the out-coupling grating 445 may be a transmissive grating. Each of the in-coupling grating 235 and the out-coupling grating 445 may be a uniform grating. For discussion purposes, each of the in-coupling grating 235 and the out-coupling grating 445 is configured as a polarization selective grating that substantially transmits a polarized light having the first polarization, and substantially diffracts a polarized light having a second polarization that is orthogonal to the first polarization.

The second reflector 440 may be similar to the second reflector 240 shown in FIG. 2A and FIG. 3. In the embodiment shown in FIG. 4, the second reflector 440 may include a second reflective layer 447 configured to reflect an image light, which is out-coupled from the curved light guide 210 by the output coupler 445, back to the output coupler 445 and the curved light guide 210. In some embodiments, the second reflective layer 447 may be a polarization selective reflective layer configured to substantially reflect a polarized light having a first polarization, and substantially transmit a polarized light having a second polarization (which may be orthogonal to the first polarization) with negligible or zero reflection. In the embodiment shown in FIG. 4, the second reflective layer 447 may be configured to maintain a polarization of a polarized light reflected thereby and a polarization of a polarized light transmitted therethrough. For example, the second reflective layer 447 may reflect the polarized light having a first polarization as a polarized light having the first polarization, and transmit the polarized light having a second polarization as a polarized light having the second polarization. In some embodiments, the second reflector 440 may include the second substrate 249 for supporting and protecting the second reflective layer 447.

The third reflector 405 may include a third reflective layer 415. In some embodiments, the third reflector 405 may also include a substrate for supporting and protecting the third reflective layer. The third reflective layer 415 may be disposed at the second surface 210-2 opposing the second reflective layer 447 disposed at the first surface 210-1. The third reflective layer 415 may have a radius of curvature that is the same as the radius of curvature $R_2$ of the second surface 210-2 of the curved light guide 210. In some embodiments, the third reflective layer 415 may be a polarization selective reflective layer configured to substantially reflect a polarized light having a second polarization, and substantially transmit a polarized light having a first polarization (orthogonal to the second polarization) with negligible or zero reflection. In the embodiment shown in FIG. 4, the third reflective layer 415 may be configured to maintain a polarization of a polarized light reflected thereby and a polarization of a polarized light transmitted therethrough. For example, the third reflective layer 415 may reflect the polarized light having the second polarization as a polarized light having the second polarization, and transmit the polarized light having the first polarization as a polarized light having the first polarization.

In some embodiments, the reflection band of the third reflective layer 415 may substantially match with the emission band of the narrowband light source include in the display element 220. For example, the reflection band of the third reflective layer 415 may include blue, green, and red bands each having a bandwidth (FWHM) within a range of about 5 nm to 10 nm, a range of about 10 nm to 20 nm, a range of about 20 nm to 30 nm, or a range of about 30 nm to 40 nm, etc.

For discussion purposes, in the embodiment shown in FIG. 4, the image light 230 (that is an input light of the curved light guide image combiner 380) output from the light source assembly 205 may be a polarized light having the first polarization (e.g., right-handed circular polarization). Coupling of the image light 230 into the curved light guide 210 may refer to the description rendered above in connection with FIG. 2C. The in-coupling grating 235 may be configured to maintain the polarization of a polarized light that is diffracted thereby or transmitted therethrough. Thus, the in-coupled image light 231 may be a polarized light having the second polarization (e.g., left-handed circular polarization).

When the in-coupled image light 231 is incident onto the out-coupling grating 445, the out-coupling grating 445 may diffract the in-coupled image light 231 into a transmissive diffraction order (that has a relatively high light intensity) and a reflective diffraction order (that has a relatively low light intensity). The transmissive diffraction order and the reflective diffraction order may be polarized lights having orthogonal polarizations. For example, the out-coupling grating 445 may couple, via forward diffraction, a major portion of the in-coupled image light 231 out of the curved light guide 210 as a plurality of output image lights 432 propagating toward the second reflective layer 447 in non-non-parallel directions. The out-coupling grating 445 may also couple, via backward diffraction, a minor portion of the in-coupled image light 231 as a plurality of output image lights 433 propagating through the curved light guide 210 toward the third reflective layer 415. The output image lights 432 may be polarized lights having the first polarization, and the image lights 433 may be polarized lights having the second polarization, which is orthogonal to the first polarization.

For discussion purposes, FIG. 4 shows three output image lights 432, and shows a single ray (e.g., central ray) 432b of each output image light 432. The three rays 432b of the respective output image lights 432 may form the same angle with the respective local normals of the out-coupling grating 445 (or the first surface 210-1 of the curved light guide 210). That is, the three rays (e.g., central rays) of the respective output image lights 432 may have the same diffraction angle. For example, as shown in FIG. 4, the three rays (432b of the respective output image lights 432 may be normally output from the out-coupling grating 445, with the respective propagation directions parallel with the respective local normals the out-coupling grating 445 (or the first surface 210-1 of the curved light guide 210). In other words, the diffraction angles of the three rays 432b of the respective output image lights 432 may be zero. The three rays 432b of the respective output image lights 432 may propagate in non-parallel directions (e.g., divergently) toward the second reflector 240.

The second reflective layer 447 may be configured to substantially reflect the output image lights 432 having the first polarization back to the curved light guide 210 as a plurality of image lights 434 having the first polarization. The reflective layer 447 may be configured to substantially reflect the three rays 432b of the respective output image lights 432 that propagate in non-parallel directions (e.g., divergently) as three rays (e.g., central rays) 434b of the respective image lights 434 that propagate in parallel directions toward the out-coupling grating 445 and the curved light guide 210.

As the out-coupling grating 445 is configured to diffract a polarized light having the second polarization, and transmit a polarized light having the first polarization, the out-coupling grating 445 may transmit the image lights 434 having the first polarization as a plurality of image lights 436 having the first polarization, while maintaining the propagation directions. The image lights 436 may be transmitted through the curved light guide 210 toward the third reflector 405. As the third reflective layer 415 is configured to reflect a polarized light having the second polarization, and transmit a polarized light having the first polarization, the third reflective layer 415 may transmit the image lights 436 having the first polarization, while maintaining the propagation directions. The image lights 436 transmitted through the third reflective layer 415 may prorogate toward the eye-box region 259. Thus, the three rays (436b of the respective image lights 436 may propagate in parallel directions toward the eye-box region 259. Thus, the curved light guide image combiner 480 including the in-coupling grating 235, the curved light guide 210, the out-coupling grating 445, the first reflector 270, the second reflector 440, and the third reflector 405 may replicate the input image light 230 as multiple output image lights 436 propagating toward the eye-box region 259, thereby expanding an effective pupil of the system 400.

The image light (the reflective diffraction order) 433 may be referred to as a leaked image light 433, which leaks out of the out-coupling grating 445. The leaked image lights 433 may cause undesirable optical effect. For discussion purposes, FIG. 4 shows three leaked image lights 433, and shows a single ray (e.g., central ray) 433b of each leaked image light 433. The three rays 433b of the respective leaked image lights 433 may form the same angle with the respective local normals of the out-coupling grating 445 (or the first surface 210-1 of the curved light guide 210). That is, the three rays 433b of the respective leaked image lights 433 may have the same diffraction angle. For example, as shown in FIG. 4, the three rays 433b of the respective leaked image lights 433 may be normally output from the out-coupling grating 445, with the respective propagation directions parallel with the respective local normals the out-coupling grating 445 (or the first surface 210-1 of the curved light guide 210). In other words, the diffraction angles of the three rays 433b of the respective leaked image lights 433 may be zero. The ray 433b of the leaked image light 433 and the ray 432b of the corresponding output image light 432 may have opposite propagation directions along the same axis, e.g., the same local surface normal of the out-coupling grating 445. The three rays 433b of the respective leaked image lights 433 may propagate in non-parallel directions (e.g., convergently) toward the third reflector 405.

To mitigate the potential undesirable optical effects that may be caused by the leaked image light 433, the third reflective layer 415 may be configured to substantially reflect the leaked image lights 433 having the second polarization back to the curved light guide 210 as a plurality of image lights 435 having the second polarization. That is, the third reflective layer 415 may be configured to recycle (or re-couple) the leaked image lights 433 into the curved light guide 210. The image lights 435 may propagate inside the curved light guide 210 via TIR, and may be incident onto different portions of the out-coupling grating 445.

The second reflective layer 415 may be configured to substantially reflect the three rays 433b of the respective leaked image lights 433 that propagate in non-parallel directions (e.g., convergently) as three rays (e.g., central rays) 435b of the respective image lights 435 that have the same TIR propagation angle inside the curved light guide 210. The TIR propagation angle of the ray 435b may be configured to be substantially the same as the TIR propagation angle of the in-coupled ray 231b. Thus, similar to the in-coupled image lights 231, the image light 435 may also be coupled out of the curved light guide 210 via the out-coupling grating 445 as a plurality of transmissive diffraction orders toward the second reflective layer 447 and a plurality of reflective diffraction orders toward the third reflective layer 415. Similar to the output rays 434b, the second reflective layer 447 may reflect the transmissive diffraction orders toward the eye-box region 259. Similar to the leaked image light 433, the third reflective layer 415 may recycle the reflective diffraction orders into the curved light guide 210.

Thus, the third reflector 405 may block the leaked, non-parallel rays 433b from propagating through the eye-box region 259. The third reflector 405 recycles the leaked, non-parallel rays 433b, and together with the second reflector 440, turns the non-parallel rays 433b into parallel rays propagating toward the eye-box region 259. Thus, the leaked image light 433 may be recycled and used as part of the image lights representing a virtual image to be perceived by the eye 260. The system 400 may provide an increased power efficiency with enhanced image quality.

The second reflector 440 may also receive the real world light 242. In some embodiments, the real world light 242 may be an unpolarized light. In some embodiments, the second reflective layer 447 may partially transmit the real world light 242 as the real world light 244 propagating toward the third reflector 405, and partially reflect the real world light 242 (not shown). In some embodiments, the second reflective layer 447 may function as an isolator to substantially transmit the real world light 242 as the real world light 244 propagating toward the third reflector 405. The third reflective layer 415 may partially transmit the real world light 244 toward the eye-box region 259, and partially reflect the real world light 244 (not shown). Thus, the curved light guide image combiner 480 may combine the real world light 242 with the image light 436 and deliver the combined light to the exit pupil 257. As a result, the eye 260 may observe the virtual scene optically combined with the real world scene.

In some embodiments, the light intensity of the leaked image light 433 may be substantially low, as compared to the light intensity of the image light 432. For example, a ratio between the light intensity of the leaked image lights 433 and the light intensity of the image light 432 may be less than 1:100. In such embodiments, the third reflector 405 may be omitted.

Although not shown, in some embodiments, the second reflective layer 447 may be a polarization non-selective partial reflective layer. For example, the second reflective layer 447 may partially reflect the respective output image lights 432 as the respective image lights 434 back to the curved light guide 210, and partially transmit the respective output image light 434 as respective image lights (not shown) propagating toward the real world environment. The three rays (e.g., central rays) of the respective image lights propagating toward the real world environment may have non-parallel (e.g., divergent) propagation directions.

For discussion purposes, in the embodiment shown in FIG. 4, both of the inner radius of curvature $R_3$ of the first reflective layer 277 and the radius of curvature $R_5$ of the second reflective layer 447 are configured to be about two times of the outer radius of curvature $R_1$ of the curved light guide 210, e.g., $R_5=R_3=$about $2*R_1$. The image plane of the display element 220 generated by the curved light image combiner 480 may be located at an infinite depth (or distance) with respect to the eye pupil 258 positioned at the eye-box region 259. In some embodiments, both of the radius of curvature $R_3$ of the first reflective layer 277 and the radius of curvature $R_5$ of the second reflective layer 447 may be configured to be greater than two times of the outer radius of curvature $R_1$ of the curved light guide 210, e.g., $R_5=R_3>2*R_1$. Thus, the image plane of the display element 220 generated by the curved light image combiner 480 may be located at a finite depth (or distance) with respect to the eye pupil 258 positioned at the eye-box region 259.

In some embodiments, at least one (e.g., each) of the radius of curvature $R_3$ of the first reflective layer 277 and the radius of curvature $R_5$ of the second reflective layer 447 may be configured to be adjustable. Thus, the distance of the image plane of the display element 220 generated by the curved light image combiner 480 with respect to the eye-box region 259 may be adjustable, for addressing the vergence accommodation conflict. Accordingly, the user experience of the system 200 may be improved. For example, in some embodiments, the second reflector 440 (or the first reflector 270) may include a piezo-membrane that is optically transparent and is deformable by, e.g., applying a voltage, and the second reflective layer 447 (or the first reflective layer 277) may be disposed at the piezo-membrane. In some embodiments, the second reflector 440 (or the first reflector 270) may include a membrane liquid lens in which an optical fluid is encapsulated by a substrate and a deformable member. The deformable member may be deformable via a suitable actuator. The second reflective layer 447 (or the first reflective layer 277) may be disposed at the deformable membrane.

Figure 5A:
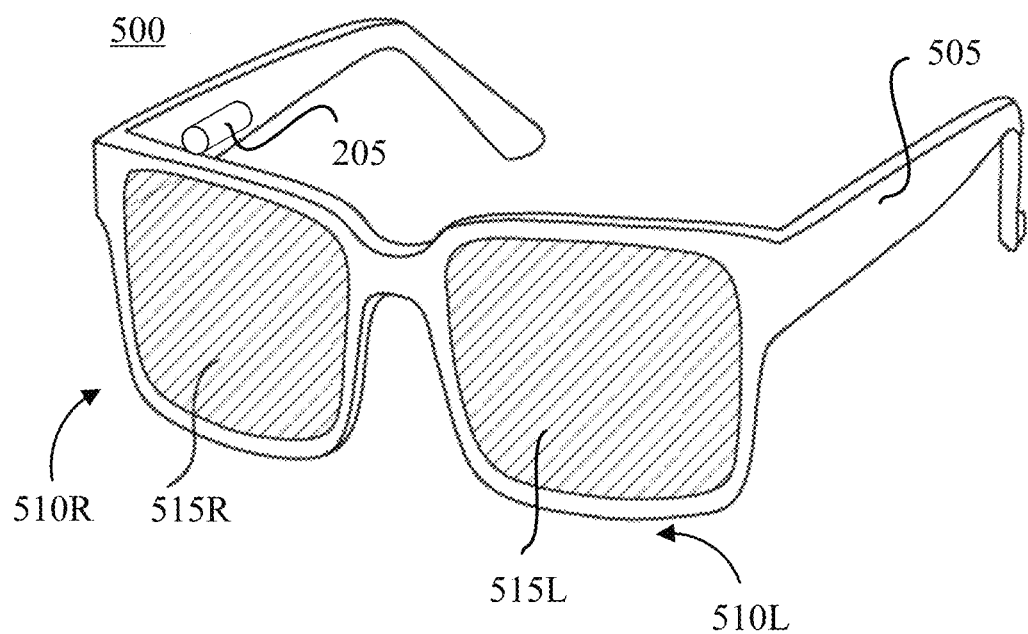
FIG. 5A illustrates a schematic diagram of an artificial reality device, according to an embodiment of the present disclosure.

FIG. 5A illustrates a schematic diagram of an artificial reality device 500 according to an embodiment of the present disclosure. In some embodiments, the artificial reality device 500 may produce VR, AR, and/or MR content for a user, such as images, video, audio, or a combination thereof. In some embodiments, the artificial reality device 500 may be smart glasses. In one embodiment, the artificial reality device 500 may be a near-eye display ("NED"). In some embodiments, the artificial reality device 500 may be in the form of eyeglasses, goggles, a helmet, a visor, or some other type of eyewear. In some embodiments, the artificial reality device 500 may be configured to be worn on a head of a user (e.g., by having the form of spectacles or eyeglasses, as shown in FIG. 5A), or to be included as part of a helmet that is worn by the user. In some embodiments, the artificial reality device 500 may be configured for placement in proximity to an eye or eyes of the user at a fixed location in front of the eye(s), without being mounted to the head of the user. In some embodiments, the artificial reality device 500 may be in a form of eyeglasses which provide vision correction to a user's eyesight. In some embodiments, the artificial reality device 500 may be in a form of sunglasses which protect the eyes of the user from the bright sunlight. The artificial reality device 500 may be in a form of safety glasses which protect the eyes of the user. In some embodiments, the artificial reality device 500 may be in a form of a night vision device or infrared goggles to enhance a user's vision at night.

Figure 5B:
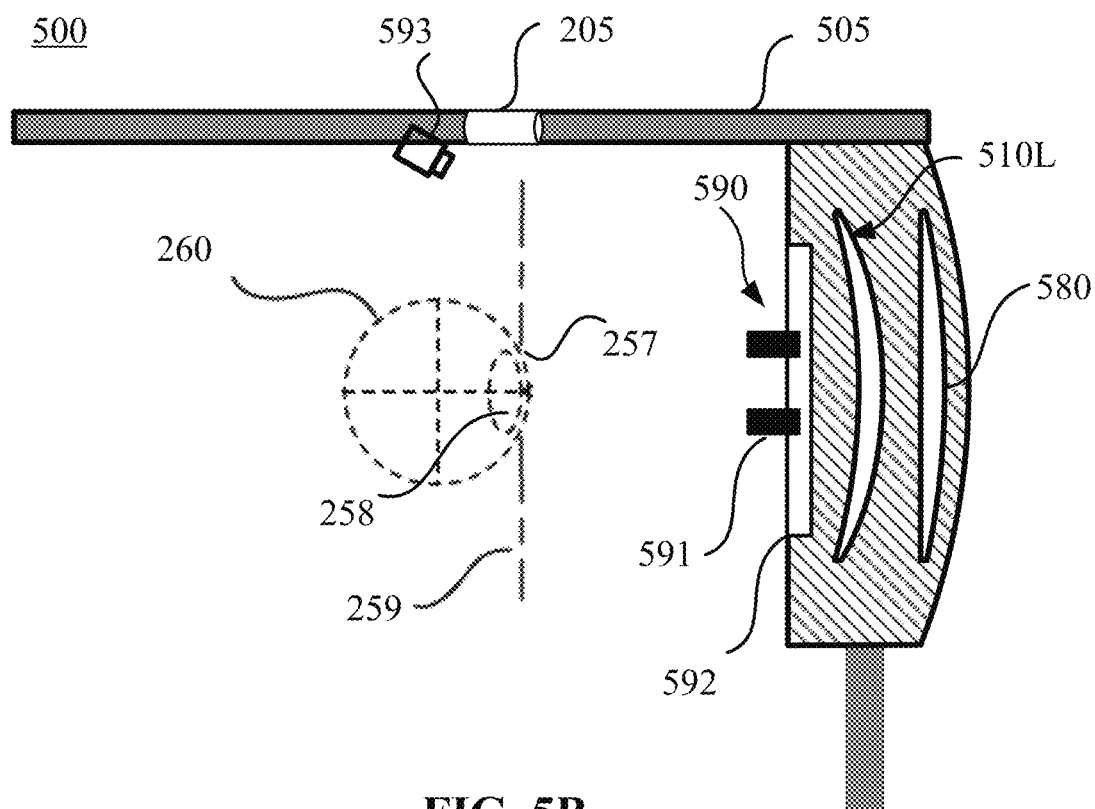
FIG. 5B schematically illustrates a cross-sectional view of half of the artificial reality device shown in FIG. 5A, according to an embodiment of the present disclosure.

For discussion purposes, FIG. 5A shows that the artificial reality device 500 includes a frame 505 configured to mount to a user's head, and left-eye and right-eye display systems 510L and 510R mounted to the frame 505. FIG. 5B is a cross-sectional view of half of the artificial reality device 500 shown in FIG. 5A according to an embodiment of the present disclosure. For illustrative purposes, FIG. 5B shows the cross-sectional view associated with a left-eye display system 510L. The frame 505 is merely an example structure to which various components of the artificial reality device 500 may be mounted. Other suitable type of fixtures may be used in place of or in combination with the frame 505.

In some embodiments, the left-eye and right-eye display systems 510L and 510R may include suitable image display components configured to project computer-generated virtual images into left and right display windows 515L and 515R. In some embodiments, each of the left-eye display system 510L and the right-eye display system 510R may include an optical system disclosed herein, such as the curved light guide display system 200 shown in FIG. 2A, the curved light guide display system 300 shown in FIG. 3, or the curved light guide display system 400 shown in FIG. 4. For illustrative purposes, FIGS. 5A and 5B show that the light source assembly 205 of the curved light guide display system 200, 300, or 400 is coupled to the frame 505. The curved light guide display system 200, 300, or 400 included in the left-eye (or right-eye) display system 510L (or 510R) may direct the image light generated by the light source assembly 205 to the eye-box region 259.

As shown in FIG. 5B, the artificial reality device 500 may also include an object tracking system 590 (e.g., eye tracking system and/or face tracking system). The object tracking system 590 may include an IR light source 591 configured to illuminate the eye 260 and/or the face, a deflecting element 592 (such as a grating), and an optical sensor 593 (such as a camera). The deflecting element 592 may deflect (e.g., diffract) the IR light reflected by the eye 260 toward the optical sensor 593. The optical sensor 593 may generate a tracking signal relating to the eye 260. The tracking signal may be an image of the eye 260. A controller (not shown), such as the controller 215, may control various optical elements based on eye-tracking information obtained from analysis of the image of the eye 260.

In some embodiments, the artificial reality device 500 may include an adaptive or active dimming element 580 configured to dynamically adjust the transmittance of lights reflected by real-world objects, thereby switching the artificial reality device 500 between a VR device and an AR device or between a VR device and an MR device. The active dimming element 580 may be disposed at a side of the curved light guide display system 200, 300, or 400 included in the left-eye display system 510L (or right-eye display system 510R) facing a real world environment. In some embodiments, along with switching between the AR/MR device and the VR device, the adaptive dimming element 580 may be used in the AR and/MR device to mitigate differences in brightness of lights reflected by real-world objects and virtual image lights.

In some embodiments, the present disclosure provides a system. The system includes a light guide having a curved surface. The system also includes an out-coupling element coupled with the light guide at an output portion of the light guide. The system also includes a reflective layer disposed at the output portion of the light guide. The out-coupling element is configured to couple a first ray propagating inside the light guide out of the light guide as a plurality of second rays propagating in non-parallel directions toward the reflective layer. The reflective layer is configured to reflect the plurality of second rays as a plurality of third rays propagating in parallel directions toward the out-coupling element and the light guide.

In some embodiments, the curved surface of the light guide is configured with a first radius of curvature, and the reflective layer is configured with a second radius of curvature that is greater than the first radius of curvature. In some embodiments, the second radius of curvature is equal to or greater than two times of the first radius of curvature. In some embodiments, the out-coupling element and the light guide are configured to transmit the third rays received from the reflective layer toward an eye-box of the device. In some embodiments, the reflective layer is disposed tangent to the curved surface of the light guide or a surface of the out-coupling element. In some embodiments, the out-coupling element is disposed at the curved surface of the light guide, and has a curved shape that matches a curved shape of the curved surface of the light guide. The reflective layer is disposed at a surface of the out-coupling element, and is tangent to the surface of the out-coupling element. The out-coupling element is located between the reflective layer and the curved surface of the light guide.

In some embodiments, the curved surface is a first curved surface of the light guide, the light guide includes an opposing second curved surface. The reflective layer is disposed at the first curved surface of the light guide, and is tangent to the first curved surface of the light guide. The out-coupling element is disposed at the second curved surface of the light guide, and has a curved shape that matches a curved shape of the second curved surface. In some embodiments, the reflective layer includes a reflection band corresponding to a primary color, the reflection band having a bandwidth within a range of about 5 nm to 10 nm, a range of about 10 nm to 20 nm, or a range of about 20 nm to 30 nm. In some embodiments, the second rays propagate toward the reflective layer from a first side of the reflective layer, and the reflective layer is configured to transmit a real world light coming from an opposing second side of the reflective layer toward the curved surface of the light guide.

In some embodiments, the reflective layer is a first reflective layer, and the device further includes an in-coupling element coupled with the light guide at an input portion of the light guide. The device also includes a second reflective layer disposed at the input portion of the light guide. In some embodiments, the curved surface of the light guide is configured with a first radius of curvature, and the second reflective layer is configured with a second radius of curvature that is greater than the first radius of curvature. In some embodiments, the second radius of curvature is equal to or greater than two times of the first radius of curvature. In some embodiments, the second reflective layer is configured to reflect a plurality of fourth rays propagating in parallel directions as a plurality of fifth rays propagating in non-parallel directions toward the in-coupling element, and the in-coupling element is configured to couple the fifth rays into the light guide as a plurality of first rays. In some embodiments, the second reflective layer is disposed tangent to the curved surface of the light guide or a surface of the in-coupling element.

In some embodiments, the curved surface is a first curved surface of the light guide, the light guide includes an opposing second curved surface. The in-coupling element is disposed at the second curved surface of the light guide, and has a curved shape that matches a curved shape of the second curved surface. The second reflective layer is disposed at the first curved surface of the light guide, and is tangent to the first curved surface of the light guide. In some embodiments, the in-coupling element is disposed at the curved surface of the light guide, and has a curved shape that matches a curved shape of the curved surface of the light guide. The second reflective layer is disposed at a surface of the in-coupling element, and is tangent to the surface of the in-coupling element. The in-coupling element is located between the second reflective layer and the curved surface of the light guide.

In some embodiments, the reflective layer is a first reflective layer, the device further includes a second reflective layer disposed at the output portion of the light guide. The first reflective layer and the second reflective layer are disposed at opposite sides of the light guide. In some embodiments, the out-coupling element is configured to: couple a first portion of the first ray propagating inside the light guide out of the light guide as the plurality of second rays propagating in non-parallel directions toward the first reflective layer, and couple a second portion of the first image ray propagating inside the light guide out of the light guide as a plurality of fourth rays propagating in non-parallel directions toward the second reflective layer. In some embodiments, the second reflective layer is configured to transmit the third rays received from the first reflective layer, and reflect the fourth rays back into the light guide.

In some embodiments, the present disclosure provides a device. The device includes a light guide having a curved surface. The device also includes an in-coupling element and a first reflective layer disposed at an input portion of the light guide. The device also includes an out-coupling element and a second reflective layer disposed at an output portion of the light guide. The first reflective layer is configured to reflect a bundle of parallel input rays of an image light received from a light source as a bundle of non-parallel input rays propagating toward the in-coupling element. The in-coupling element is configured to couple the bundle of non-parallel input rays into the light guide as a bundle of parallel in-coupled rays. The out-coupling element is configured to couple each parallel in-coupled ray in the bundle of parallel in-coupled rays out of the light guide as a plurality of non-parallel output rays propagating toward the second reflective layer. The second reflective layer is configured to reflect the plurality of non-parallel output rays back to the light guide as a plurality of parallel output rays, the parallel output rays being transmitted through the out-coupling element and the light guide.

In some embodiments, a device is provided. The device includes a light guide having a curved surface. The device also includes an in-coupling element disposed at an input portion of the light guide. The device also includes a first reflective layer having a curved shape and disposed at the input portion, the first reflective layer configured to reflect parallel input light rays from a light source as non-parallel input light rays toward the in-coupling element, wherein the in-coupling element is configured to couple the non-parallel input light rays into the light guide as in-coupled light rays having the same total internal reflection ("TIR") propagation angle. The device further includes an out-coupling element disposed at an output portion of the light guide. The device further includes a second reflective layer having a curved shape and disposed at the output portion. The out-coupling element is configured to couple the in-coupled light rays out of the light guide as non-parallel output light rays toward the second reflective layer. The second reflective layer is configured to reflect the non-parallel output light rays back to the light guide as parallel output light rays, which transmit through the out-coupling element and the light guide toward an eye-box region of the device.

The foregoing description of the embodiments of the present disclosure have been presented for the purpose of illustration. It is not intended to be exhaustive or to limit the disclosure to the precise forms disclosed. Persons skilled in the relevant art can appreciate that modifications and variations are possible in light of the above disclosure.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
   a light guide having a curved surface;
   an out-coupling element coupled with the light guide at an output portion of the light guide; and
   a reflective layer disposed at the output portion of the light guide,
   wherein the out-coupling element is configured to couple a first ray propagating inside the light guide out of the light guide as a plurality of second rays propagating in non-parallel directions toward the reflective layer, and
   wherein the reflective layer is configured to reflect the plurality of second rays as a plurality of third rays propagating in parallel directions toward the out-coupling element and the light guide.

2. The device of claim 1, wherein the curved surface of the light guide is configured with a first radius of curvature, and the reflective layer is configured with a second radius of curvature that is greater than the first radius of curvature.

3. The device of claim 2, wherein the second radius of curvature is equal to or greater than two times of the first radius of curvature.

4. The device of claim 1, wherein the out-coupling element and the light guide are configured to transmit the third rays received from the reflective layer toward an eye-box of the device.

5. The device of claim 1, wherein the reflective layer is disposed tangent to the curved surface of the light guide or a surface of the out-coupling element.

6. The device of claim 1, wherein
   the out-coupling element is disposed at the curved surface of the light guide, and has a curved shape that matches a curved shape of the curved surface of the light guide,
   the reflective layer is disposed at a surface of the out-coupling element, and is tangent to the surface of the out-coupling element, and
   the out-coupling element is located between the reflective layer and the curved surface of the light guide.

7. The device of claim 1, wherein
   the curved surface is a first curved surface of the light guide,
   the light guide includes an opposing second curved surface,
   the reflective layer is disposed at the first curved surface of the light guide, and is tangent to the first curved surface of the light guide, and
   the out-coupling element is disposed at the second curved surface of the light guide, and has a curved shape that matches a curved shape of the second curved surface.

8. The device of claim 1, wherein the reflective layer includes a reflection band corresponding to a primary color, the reflection band having a bandwidth within a range of about 5 nm to 10 nm, a range of about 10 nm to 20 nm, or a range of about 20 nm to 30 nm.

9. The device of claim 1, wherein
   the second rays propagate toward the reflective layer from a first side of the reflective layer, and
   the reflective layer is configured to transmit a real world light coming from an opposing second side of the reflective layer toward the curved surface of the light guide.

10. The device of claim 1, wherein the reflective layer is a first reflective layer, and the device further comprises:
   an in-coupling element coupled with the light guide at an input portion of the light guide; and a second reflective layer disposed at the input portion of the light guide.

11. The device of claim 10, wherein the curved surface of the light guide is configured with a first radius of curvature, and the second reflective layer is configured with a second radius of curvature that is greater than the first radius of curvature.

12. The device of claim 11, wherein the second radius of curvature is equal to or greater than two times of the first radius of curvature.

13. The device of claim 10, wherein:
the second reflective layer is configured to reflect a plurality of fourth rays propagating in parallel directions as a plurality of fifth rays propagating in non-parallel directions toward the in-coupling element, and
the in-coupling element is configured to couple the fifth rays into the light guide as a plurality of first rays.

14. The device of claim 10, wherein the second reflective layer is disposed tangent to the curved surface of the light guide or a surface of the in-coupling element.

15. The device of claim 10, wherein
the curved surface is a first curved surface of the light guide,
the light guide includes an opposing second curved surface,
the in-coupling element is disposed at the second curved surface of the light guide, and has a curved shape that matches a curved shape of the second curved surface, and
the second reflective layer is disposed at the first curved surface of the light guide, and is tangent to the first curved surface of the light guide.

16. The device of claim 10, wherein
the in-coupling element is disposed at the curved surface of the light guide, and has a curved shape that matches a curved shape of the curved surface of the light guide,
the second reflective layer is disposed at a surface of the in-coupling element, and is tangent to the surface of the in-coupling element, and
the in-coupling element is located between the second reflective layer and the curved surface of the light guide.

17. The device of claim 1, wherein
the reflective layer is a first reflective layer,
the device further includes a second reflective layer disposed at the output portion of the light guide, and
the first reflective layer and the second reflective layer are disposed at opposite sides of the light guide.

18. The device of claim 17, wherein the out-coupling element is configured to:
couple a first portion of the first ray propagating inside the light guide out of the light guide as the plurality of second rays propagating in non-parallel directions toward the first reflective layer, and
couple a second portion of the first image ray propagating inside the light guide out of the light guide as a plurality of fourth rays propagating in non-parallel directions toward the second reflective layer.

19. The device of claim 18, wherein the second reflective layer is configured to transmit the third rays received from the first reflective layer, and reflect the fourth rays back into the light guide.

20. A device, comprising:
a light guide having a curved surface;
an in-coupling element and a first reflective layer disposed at an input portion of the light guide; and
an out-coupling element and a second reflective layer disposed at an output portion of the light guide,
wherein the first reflective layer is configured to reflect a bundle of parallel input rays of an image light received from a light source as a bundle of non-parallel input rays propagating toward the in-coupling element,
wherein the in-coupling element is configured to couple the bundle of non-parallel input rays into the light guide as a bundle of parallel in-coupled rays,
wherein the out-coupling element is configured to couple each parallel in-coupled ray in the bundle of parallel in-coupled rays out of the light guide as a plurality of non-parallel output rays propagating toward the second reflective layer, and
wherein the second reflective layer is configured to reflect the plurality of non-parallel output rays back to the light guide as a plurality of parallel output rays, the parallel output rays being transmitted through the out-coupling element and the light guide.

* * * * *